(12) United States Patent  (10) Patent No.: US 9,305,249 B2
Mori  (45) Date of Patent: Apr. 5, 2016

(54) IMAGE FORMING APPARATUS, IMAGE FORMING METHOD, AND COMPUTER-READABLE MEDIUM FOR RASTERIZING SCAN LINE USING INTERMEDIATE DATA

(75) Inventor: Hiroshi Mori, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 417 days.

(21) Appl. No.: 13/482,252

(22) Filed: May 29, 2012

(65) Prior Publication Data

US 2012/0320390 A1  Dec. 20, 2012

(30) Foreign Application Priority Data

Jun. 20, 2011 (JP) ................... 2011-136710

(51) Int. Cl.
H04N 1/60 (2006.01)
G06K 15/02 (2006.01)
G06F 3/12 (2006.01)

(52) U.S. Cl.
CPC ........ *G06K 15/1851* (2013.01); *G06K 15/1852* (2013.01)

(58) Field of Classification Search
CPC G06K 15/1851; G06K 15/1852; G06K 15/00
See application file for complete search history.

(56) References Cited

U.S. PATENT DOCUMENTS

| 6,476,931 | B1* | 11/2002 | Aizikowitz | G06K 15/00 358/1.17 |
| 2007/0177177 | A1* | 8/2007 | Murakami | G06T 11/203 358/1.13 |
| 2008/0273218 | A1* | 11/2008 | Kitora | G06K 9/00463 358/1.13 |
| 2012/0086970 | A1* | 4/2012 | Takahashi | G06K 15/1859 358/1.13 |

FOREIGN PATENT DOCUMENTS

JP 2003-072162 A 3/2003

* cited by examiner

*Primary Examiner* — Barbara Reinier
*Assistant Examiner* — Henok A Shiferaw
(74) *Attorney, Agent, or Firm* — Fitzpatrick, Cella, Harper & Scinto

(57) ABSTRACT

An image forming apparatus which divides image data into predetermined unit blocks and forms an image, the apparatus comprises: a determination unit that determines continuous block lines, that include closed regions having identical components, among a plurality of block lines included in a block; a generation unit that generates data of an intermediate language of each of the blocks using pieces of information of the plurality of block lines and the determination result obtained by the determination unit; a selection unit that selects an image forming method corresponding to the data of the intermediate language of each of the blocks, that is generated by the generation unit; and a forming unit that forms an image of the data of the intermediate language of each of the blocks, in accordance with the image forming method selected by the selection unit.

8 Claims, 25 Drawing Sheets

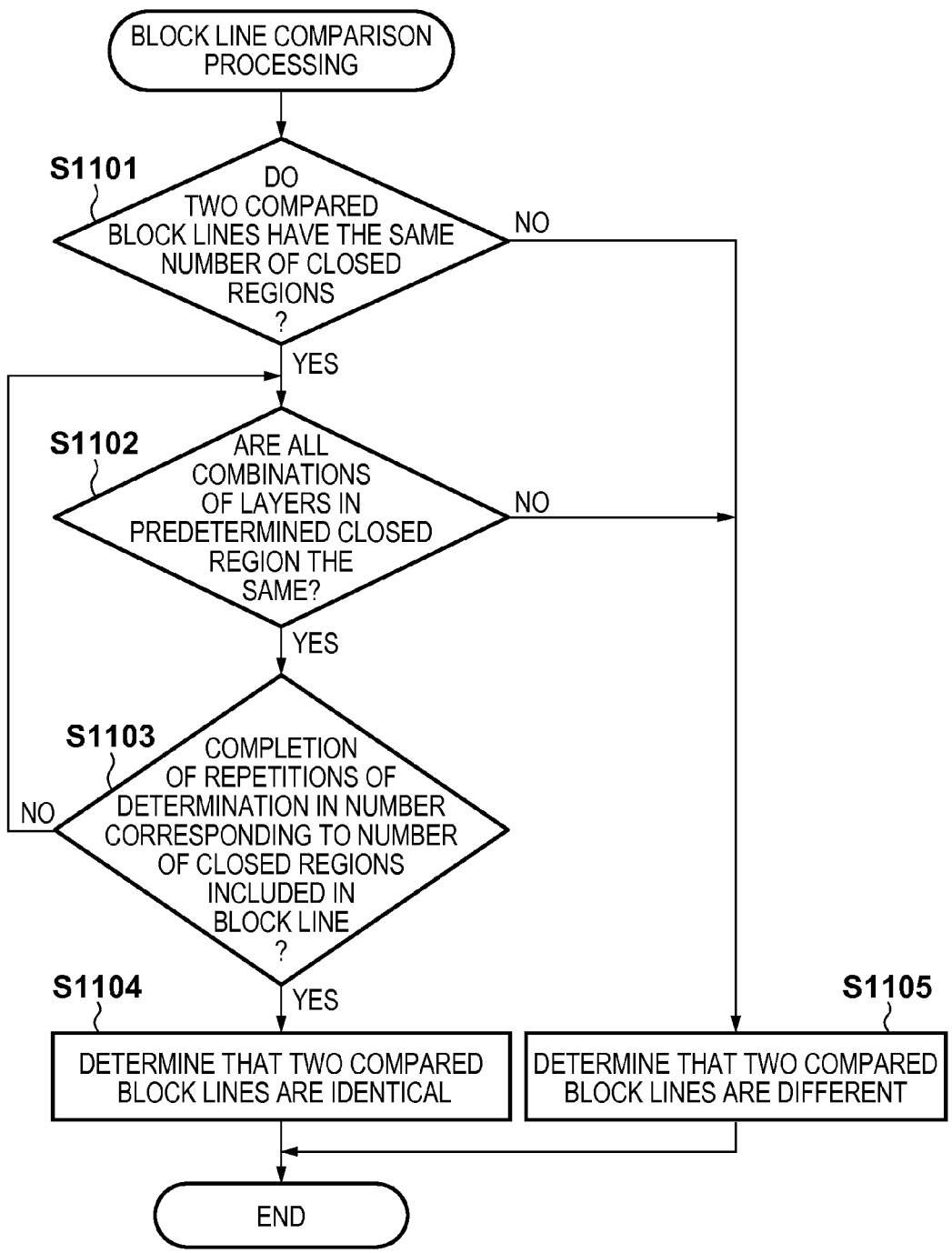

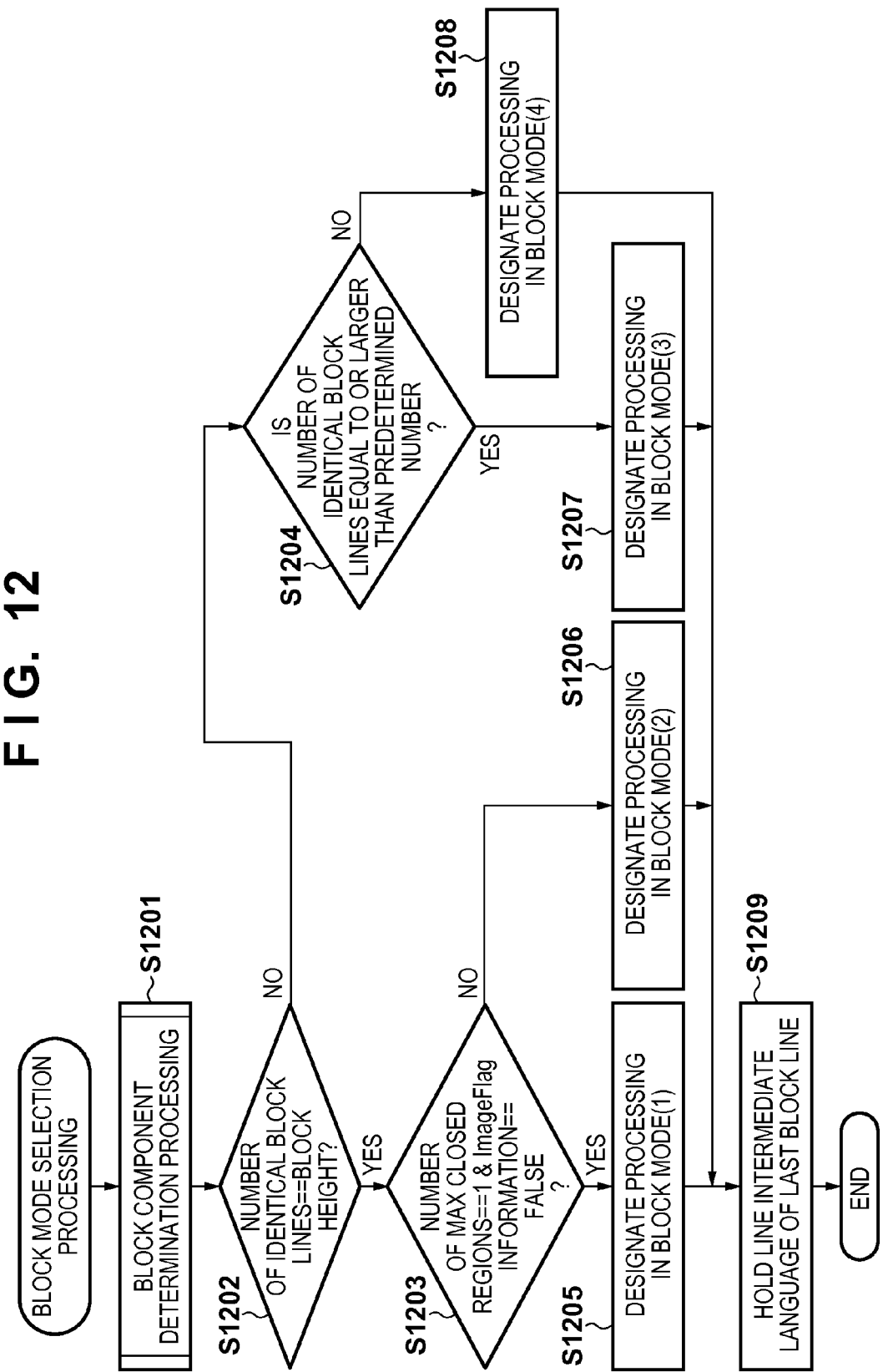

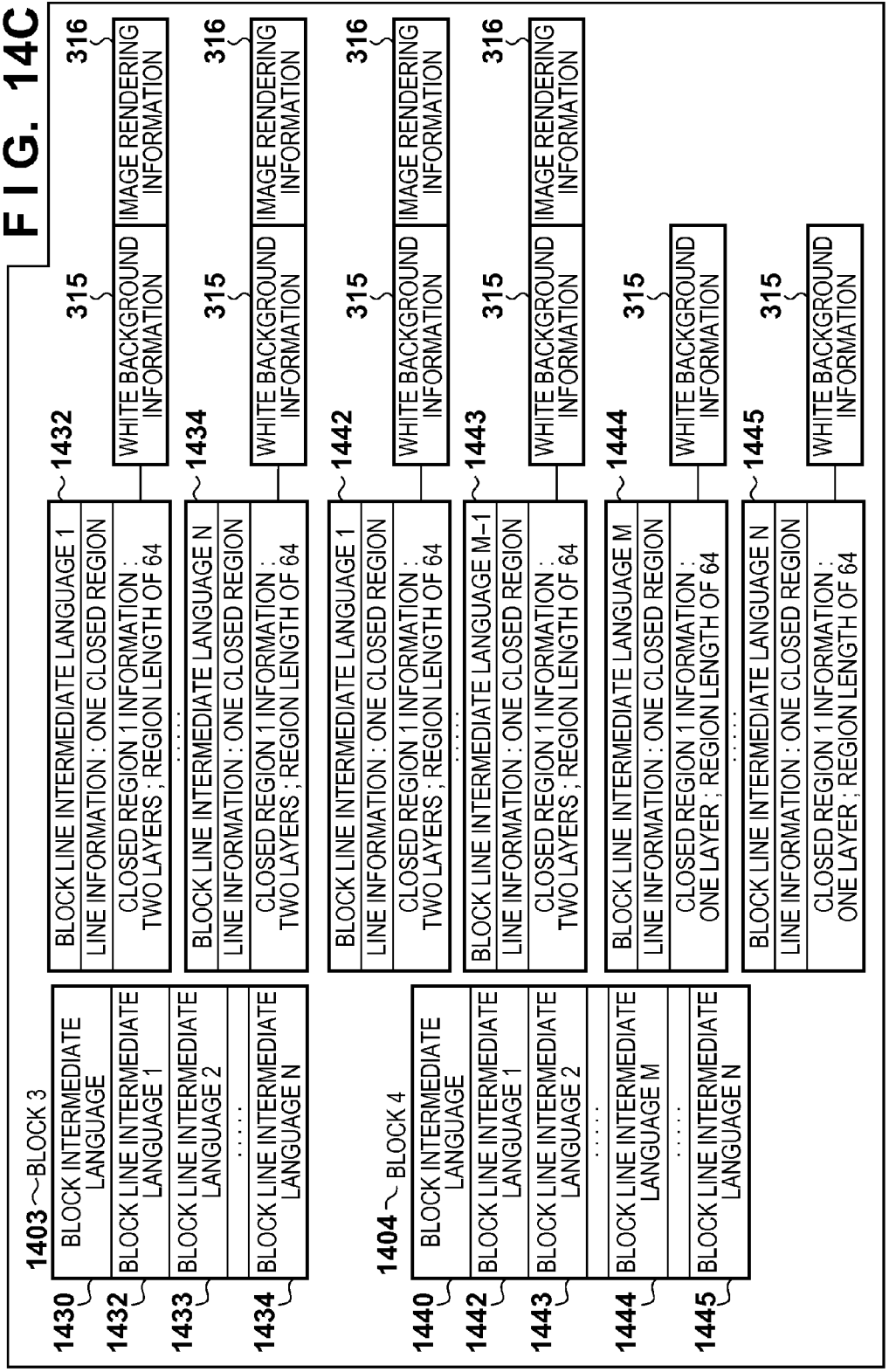

F I G. 16A
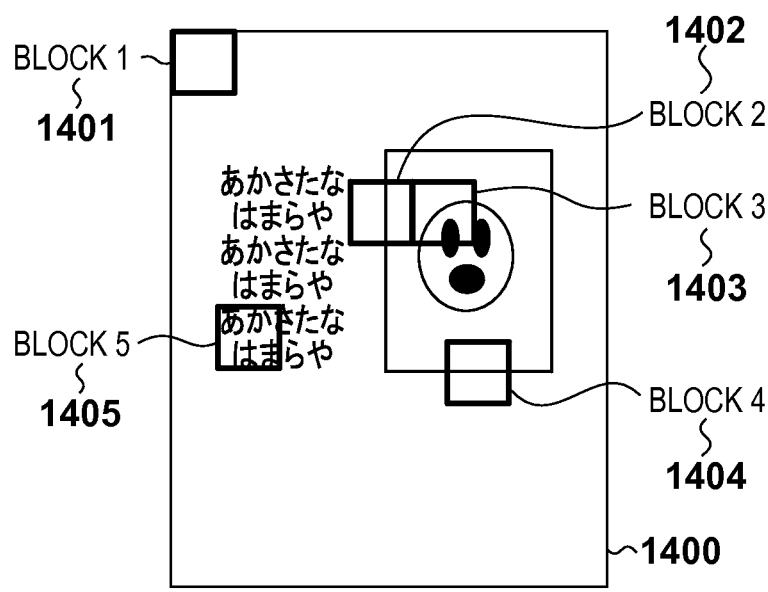

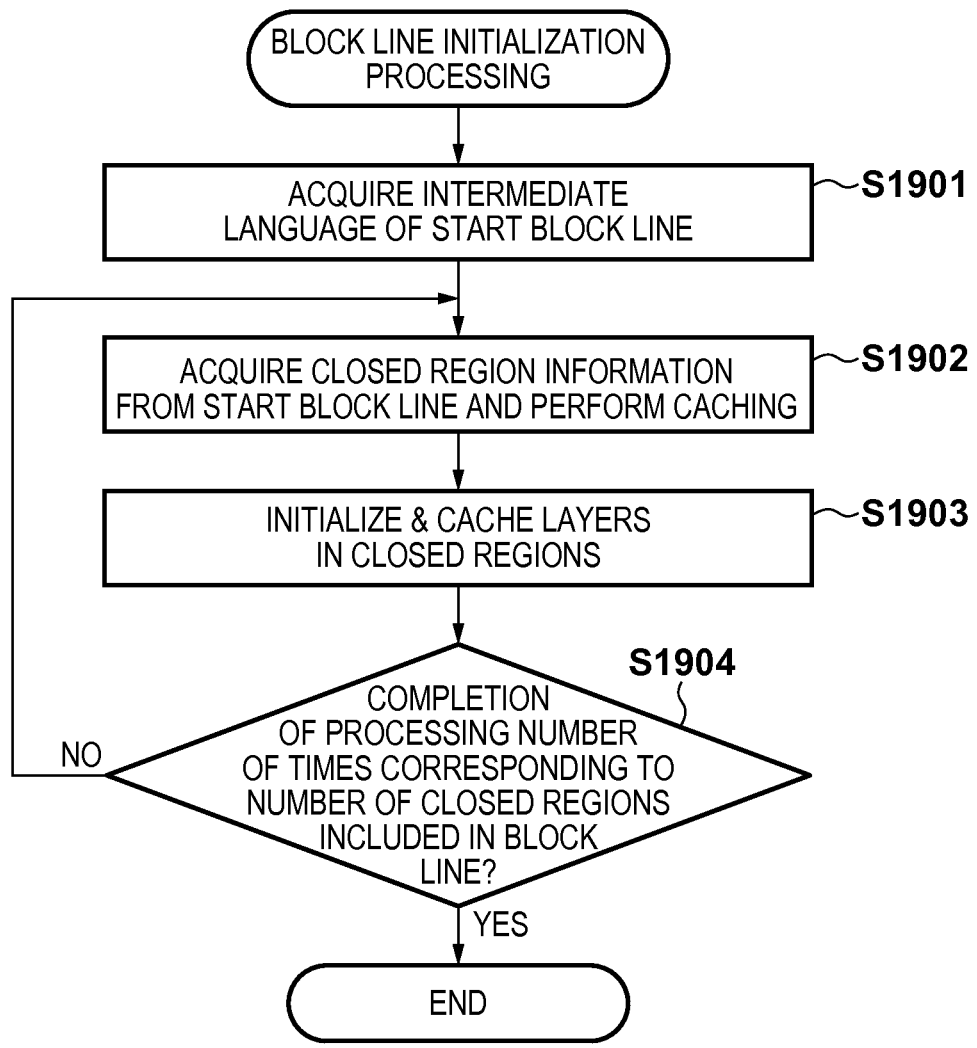
F I G. 19

F I G. 20
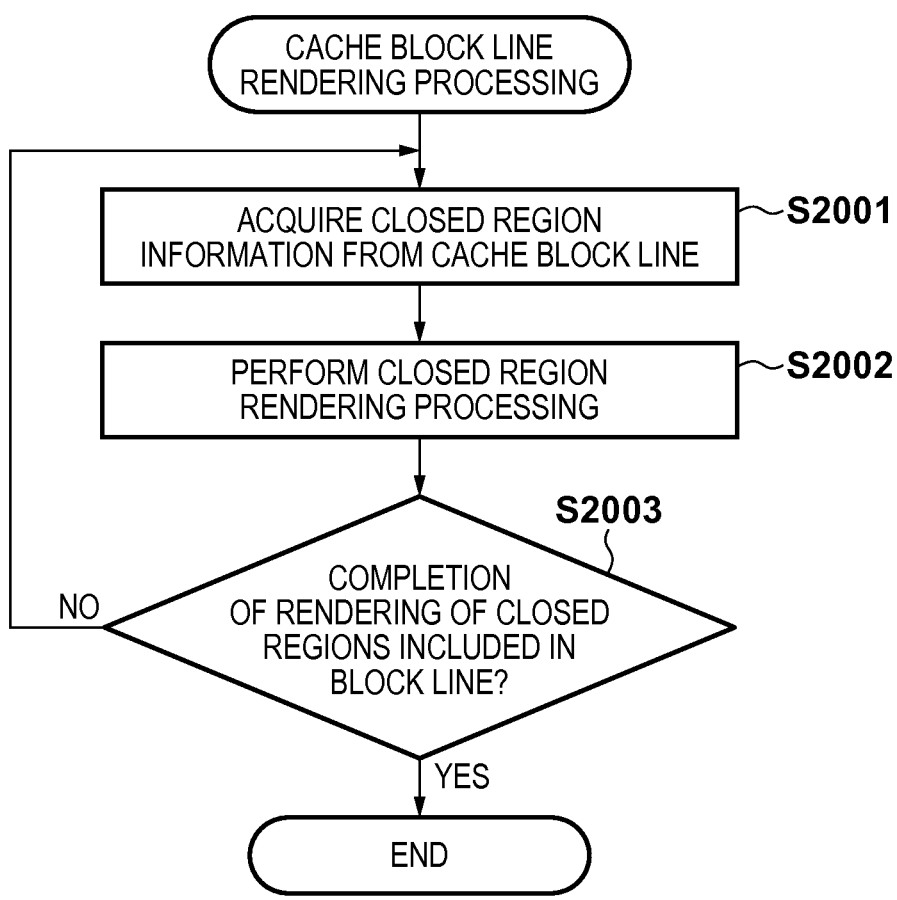

IMAGE FORMING APPARATUS, IMAGE FORMING METHOD, AND COMPUTER-READABLE MEDIUM FOR RASTERIZING SCAN LINE USING INTERMEDIATE DATA

BACKGROUND OF THE INVENTION

1. Field of the Invention

The present invention relates to an image forming apparatus, an image forming method, and a computer-readable medium. The present invention relates more particularly to an image forming technique for image data when intermediate language generation processing and rendering processing are performed for each predetermined block in outputting the image data.

2. Description of the Related Art

Conventionally, as an image forming method for image data, the so-called scan line model in which image forming processing is performed for each line is available. The scan line model according to the related art will be described later as the background of the present invention.

As a speed-up method for the image forming method based on the scan line model, a technique which achieves a speed-up by sharing predetermined information of a line intermediate language for every line image forming processing has already come into practical use (see Japanese Patent Laid-Open No. 2003-072162).

The speed-up method makes it possible to reduce the frequency of memory access, the bandwidth used for processing, the load of the apparatus, and the influence that the apparatus exerts on other systems. In addition, various speed-up methods such as sharing of the information of a rendering object extending across divided band regions between individual bands have been proposed.

Also, to reduce the number of resources utilized to form an image (mainly the memory usage), a technique of dividing image data into blocks each having a predetermined size, and performing image forming processing has recently come to be used. Such an image forming technique for each block has been proposed. The image forming technique for each block according to the related art will be described later as the background of the present invention.

The case wherein the speed-up method for the image forming method based on the scan line model is applied to the image forming processing for each block will be considered herein. At this time, if it is determined whether speed-up processing is to be applied, based on an edge on a line on a page in the conventional technique, optimum image forming processing for each block often becomes impossible.

For example, in forming an image of a block 1 501 shown in FIG. 6, the block rendering line information of a block rendering line 1 502 takes the form of a block line intermediate language 506. Also, when the above-mentioned speed-up method is applied, the pieces of block rendering line information of the second and subsequent block rendering lines (for example, a block rendering line 503) take the form of a block line intermediate language 507. Note that the combination of the number of closed regions/the number of layers included in each closed region/the layer information remains the same in each block line, so acquisition of block rendering line information can be omitted for the second and subsequent block rendering lines, and their pieces of block rendering line information take the form of the block line intermediate language 507. In this manner, the above-mentioned speed-up method is directly applicable to the block 1 501.

However, in a block 2 601, the block rendering line information of a block rendering line 1 602 takes the form of a block line intermediate language 606. Also, the block rendering line information of a block rendering line 2 603 takes the form of a block line intermediate language 607. Then, the block rendering line 1 602 includes only one closed region, while the block rendering line 2 603 includes two closed regions. Therefore, even if these two block rendering lines are included in an identical-line-information region 2 405 indicated by an edge addition line, the characteristics vary in each individual line within the block upon division into blocks.

Also, in rendering a portion such as a region 701 having high edge addition frequency, shown in FIG. 7, edge addition occurs at relatively high frequency due to the presence of leftmost character information. Note that in rendering a block 3 702, if it is determined that the speed-up method is to be performed using the conventional edge addition lines, the block intermediate language of a block rendering line 1 703 takes the form of a block line intermediate language 710. Similarly, the pieces of block rendering line information of a block rendering line 2 704 and subsequent block rendering lines take the form of the same, block line intermediate language 710. However, upon determination that, for example, an addition line for each line edge is to be applied to the region 701 having high edge addition frequency, it is determined that the speed-up method is inapplicable, and it is, in turn, determined that no block line intermediate language can be omitted.

Further, both the block line intermediate language of block rendering line N in the block 3 702, and that of a block rendering line 1 707 in a block 4 705 take the form of the block line intermediate language 710. However, in the conventional technique in which omission of a block line intermediate language is determined based on whether the same block line intermediate language is to be used for each block rendering line in the sub-scanning direction, the same block line intermediate language as in the last block rendering line cannot be used in the next block rendering line even if the block rendering line 1 707 in block 4 undergoes the same type of rendering as that for the block rendering line information processed last time.

The present invention has been made in consideration of the above-mentioned conventional problem, and provides block image forming processing which can appropriately determine whether data optimization is possible for each block even if image data is divided into blocks, and can be speeded up.

SUMMARY OF THE INVENTION

According to one aspect of the present invention, there is provided an image forming apparatus which divides image data into predetermined unit blocks and forms an image, the apparatus comprising: a block component determination unit configured to determine continuous block lines, that include closed regions having identical components, among a plurality of block lines included in a block; a block intermediate language generation unit configured to generate data of an intermediate language of each of the blocks using pieces of information of the plurality of block lines and the determination result obtained by the block component determination unit; a block image forming method selection unit configured to select an image forming method corresponding to the data of the intermediate language of each of the blocks, that is generated by the block intermediate language generation unit; and an image forming unit configured to form an image of the data of the intermediate language of each of the blocks, in accordance with the image forming method selected by the block image forming method selection unit.

According to another aspect of the present invention, there is provided an image forming method of dividing image data into predetermined unit blocks and forming an image, the method comprising the steps of: determining continuous block lines, that include closed regions having identical components, among a plurality of block lines included in a block; generating data of an intermediate language of each of the blocks using pieces of information of the plurality of block lines and the determination result obtained in the determining step; selecting an image forming method corresponding to the data of the intermediate language of each of the blocks, that is generated in the generating step; and forming an image of the data of the intermediate language of each of the blocks, in accordance with the image forming method selected in the selecting step.

According to another aspect of the present invention, there is provided a computer-readable medium storing a program for causing a computer to function as: a block component determination unit configured to divide image data into predetermined unit blocks, and determines continuous block lines, that include closed regions having identical components, among a plurality of block lines included in a block to be determined; a block intermediate language generation unit configured to generate data of an intermediate language of each of the blocks using pieces of information of the plurality of block lines and the determination result obtained by the block component determination unit; a block image forming method selection unit configured to select an image forming method corresponding to the data of the intermediate language of each of the blocks, that is generated by the block intermediate language generation unit; and an image forming unit configured to form an image of the data of the intermediate language of each of the blocks, in accordance with the image forming method selected by the block image forming method selection unit.

According to the present invention, it is possible to perform image forming processing using a block line intermediate language appropriate for each block even if image data is divided into blocks, and speed up the processing.

Further features of the present invention will become apparent from the following description of exemplary embodiments with reference to the attached drawings.

BRIEF DESCRIPTION OF THE DRAWINGS

FIG. 11 is a flowchart showing the detailed sequence of block line comparison processing;

FIG. 12 is a flowchart showing the detailed sequence of block mode selection processing;

FIGS. 14A, 14B, and 14C are views showing the concept of block intermediate languages generated in accordance with the components of each block according to the related art;

FIGS. 16A, 16B, and 16C are views showing the concept of the block intermediate language of each block, which is generated upon the block intermediate language generation processing;

FIG. 19 is a flowchart showing the detailed sequence of block line initialization processing;

FIG. 20 is a flowchart showing the detailed sequence of cache block line rendering processing.

DESCRIPTION OF THE EMBODIMENTS

Related Art as Background of Present Invention

As one of the conventional image forming methods for image data, an image forming method called a scan line model in which image forming processing is performed for each line is available. An image forming method applicable to the present invention will be described herein.

Figure 2:
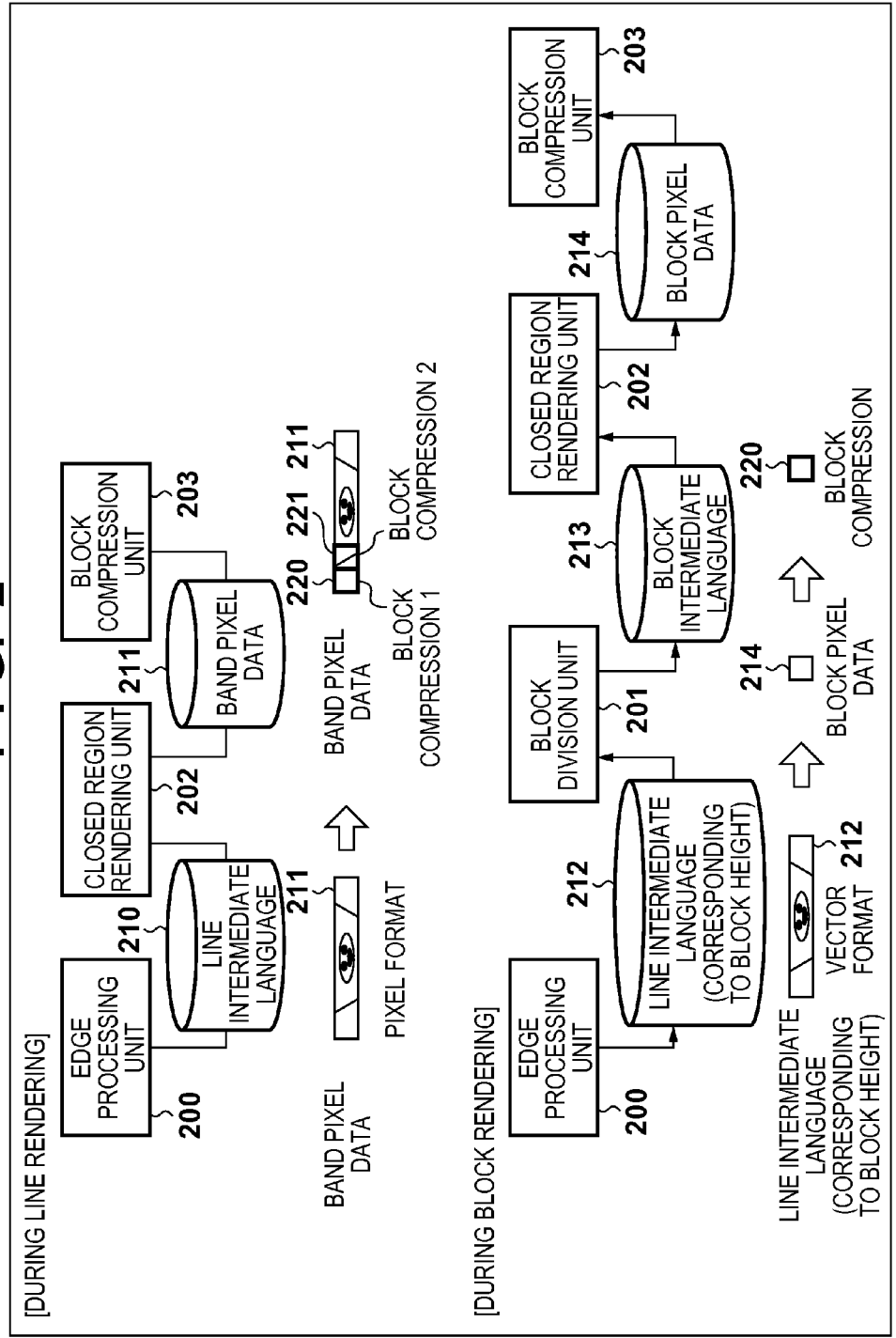
FIG. 2 is a block diagram illustrating an example of an image forming method based on a scan line model in which image forming processing is performed for each line, and a block which implements the image forming method for each block.
Figure 3:
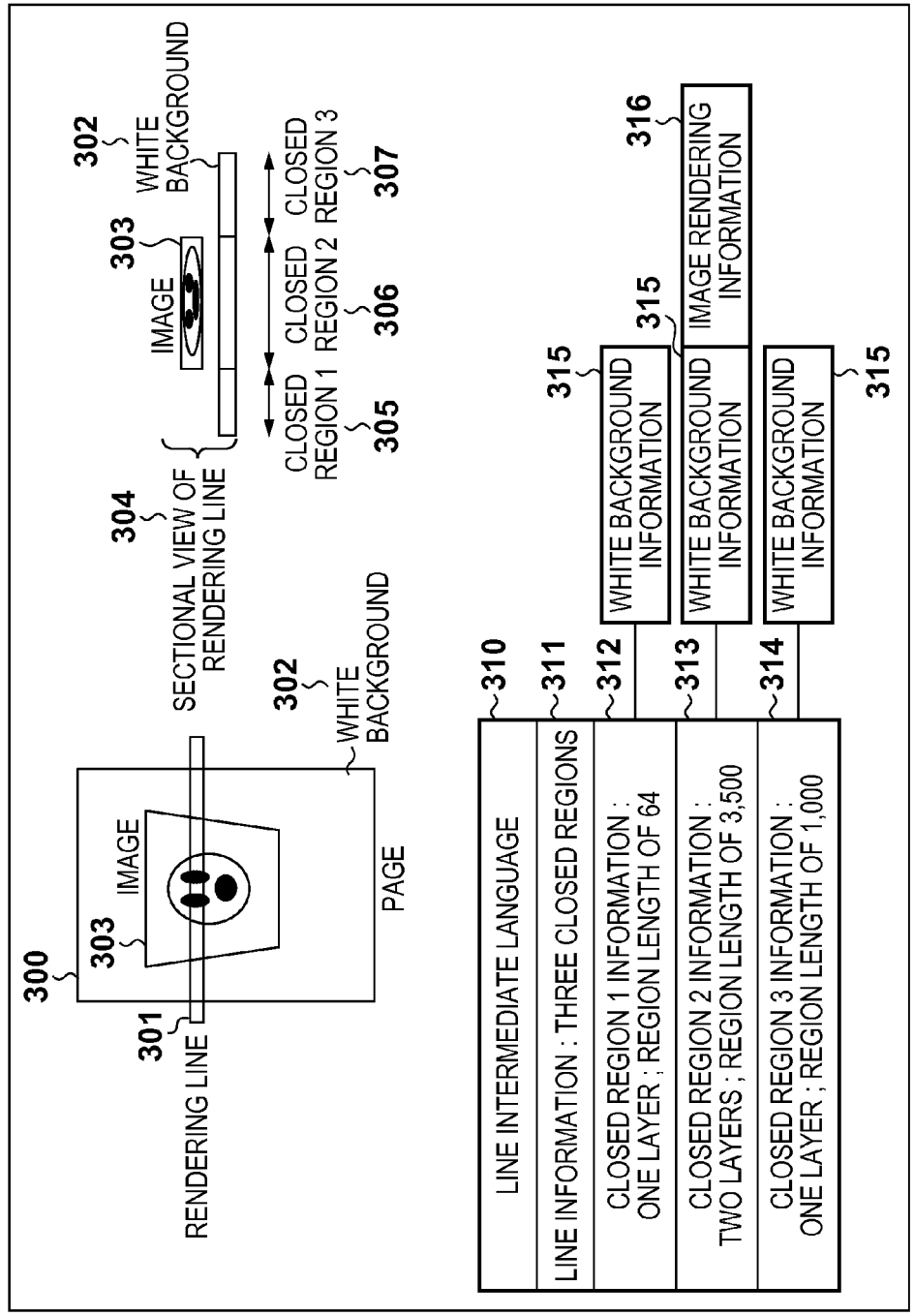
FIG. 3 is a view illustrating an example of an image forming method based on a scan line model in which image forming processing is performed for each line, and its speed-up method.

In forming an image based on image data such as a page 300 shown in, for example, FIG. 3, image forming processing is performed for each line in the main scanning direction from the upper edge of the page. In rendering a rendering line 301 for each line such as a rendering line 301, an edge processing unit 200 shown in FIG. 2 detects closed regions 305, 306, and 307 from the two edges of the page and the contour information of an object (an image 303 in this case). Based on these pieces of information, the edge processing unit 200 generates a line intermediate language 310 as data defined by the intermediate language for each line.

The line intermediate language 310 includes line information 311 including the number of closed regions included in each line, and pieces of closed region information 312, 313, and 314 including the lengths of the closed regions and the numbers of overlapping objects (the number of layers), as shown in FIG. 3. Further, the line intermediate language 310 holds the pieces of rendering information of overlapping objects (layers) (white background information 315 and image rendering information 316). The white background information 315 represents the rendering information of a white background 302. Also, the image rendering information 316 represents the rendering information of the image 303. A closed region rendering unit 202 shown in FIG. 2 generates pixel data in a predetermined closed region based on a line intermediate language 210 (the line intermediate language 310 in forming an image of the rendering line 301) to generate band pixel data 211. A block compression unit 203 performs two types of compression processing 220 and 221 for each predetermined block the moment it is detected that the band pixel data 211 is stored in an amount corresponding to a predetermined height.

Note that since an image in, for example, the JPEG format is compressed for each set of 8×8 pixels, compression processing is performed the moment pixel data having a pixel height of at least 8 pixels is completed. In other types of compression, compression is performed the moment storage of pixel data corresponding to the predetermined pixel height is completed. At this time, the closed region rendering unit 202 expands pixel data corresponding to the band into a memory. Therefore, raw pixel data is expanded into the memory, so the system bandwidth is considerably consumed.

Figure 4:
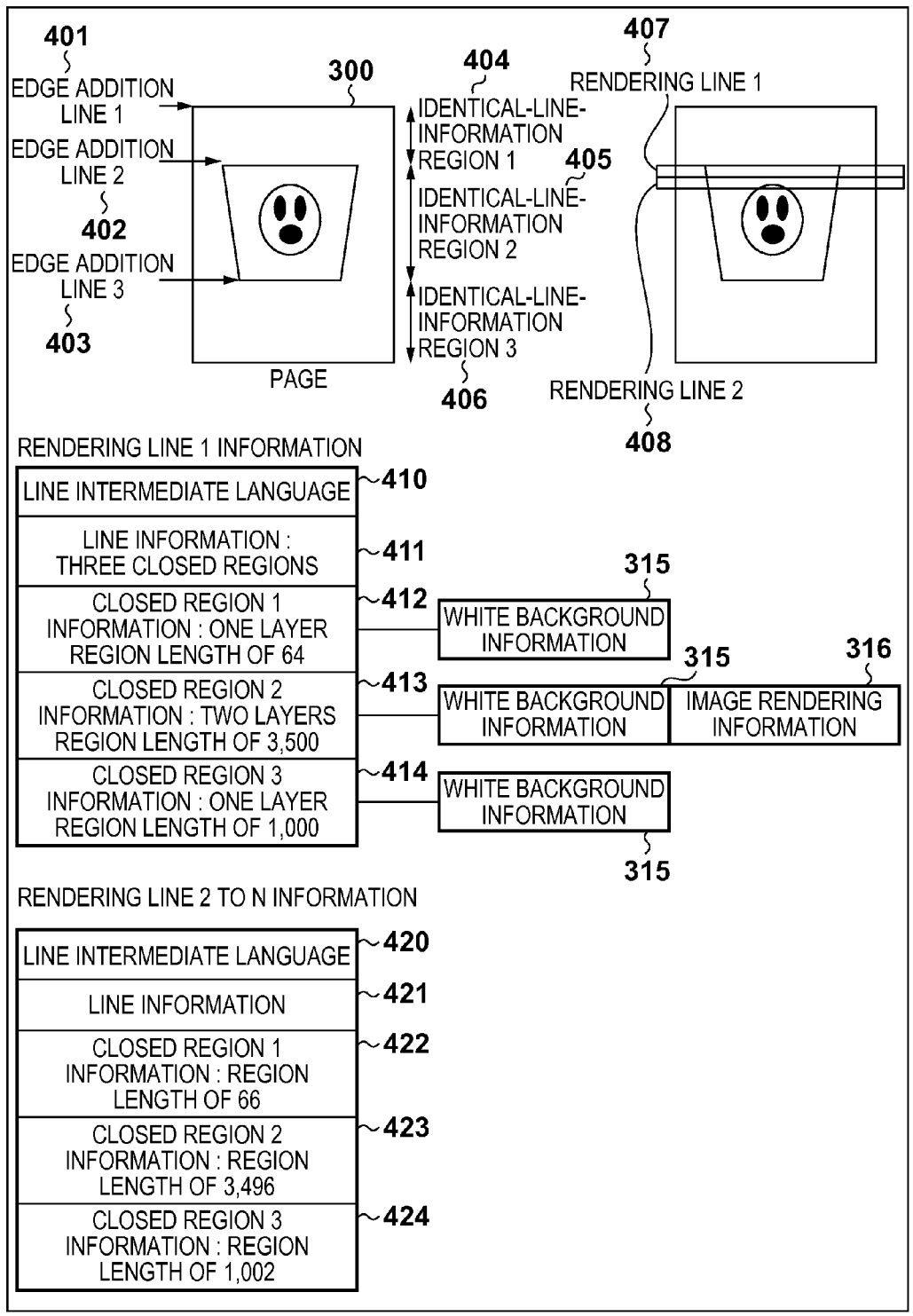
FIG. 4 is a view illustrating another example of the image forming method based on a scan line model in which image forming processing is performed for each line, and its speed-up method.

A speed-up method for the image forming method based on the scan line model applicable to the present invention will be described next. For example, as shown in FIG. 4, in rendering the page 300, the contour of the object changes on an edge addition line 1 401, an edge addition line 2 402, and an edge addition line 3 403. Then, an identical-line-information region 1 404, identical-line-information region 2 405, and identical-line-information region 3 406 surrounded by the edge addition lines include the same object. Therefore, for example, the line intermediate language of a rendering line 1 407 at the uppermost edge of the identical-line-information region 2 405 is a line intermediate language 410.

Also, the region lengths of closed region 1 information 412, closed region 2 information 413, and closed region 3 information 414 change on a rendering line 2 408. However, the number of closed regions included in line information 411, and the number of layers in each of the closed region 1 information 412, closed region 2 information 413, and closed region 3 information 414 remain the same. Using this feature, line intermediate languages having values obtained by changing only the region length are generated in the form of "rendering line 2 to N information" for pieces of line information of the rendering line 2 408 to the last line of the identical-line-information region 2 405, and image forming processing is performed based on the generated line intermediate languages.

This reduces the data size of the line intermediate language 210 transferred to the closed region rendering unit 202, the traffic of communication processing, and the number of various types of processing for closed region information and object information, thereby achieving a speed-up. This, in turn, makes it possible to reduce the frequency of memory access, thus reducing the usage of the above-mentioned bandwidth, the load of the closed region rendering unit 202, and the influence that the closed region rendering unit 202 exerts on other systems.

Image forming processing in which image data is divided into blocks each having a predetermined size and which is applicable to the present invention will be described next. When, for example, compression is to be performed for each block mentioned above, the band pixel data 211 corresponding to at least a predetermined block height must be temporarily stored in the memory, so the storage requires a very large memory size. Hence, as described in "During Block Rendering" in FIG. 2, the band pixel data 211 corresponding to the block height is temporarily stored in the memory in the form of a line intermediate language 212. Upon this operation, even when the same block height is used, the band pixel data 211 is stored in the vector format to reduce the memory usage.

A block division unit 201 shown in FIG. 2 generates a block intermediate language 213 by dividing the line intermediate language 212 into blocks having a predetermined width. The closed region rendering unit 202 forms an image based on the block intermediate language 213 to generate pixel data for each block. This makes it possible to reduce the size of pixel data to be stored to a predetermined block size and store the pixel data. The block intermediate language 213 is formed by closed region information corresponding to a region having a predetermined width in the line intermediate language 310.

Figure 5:
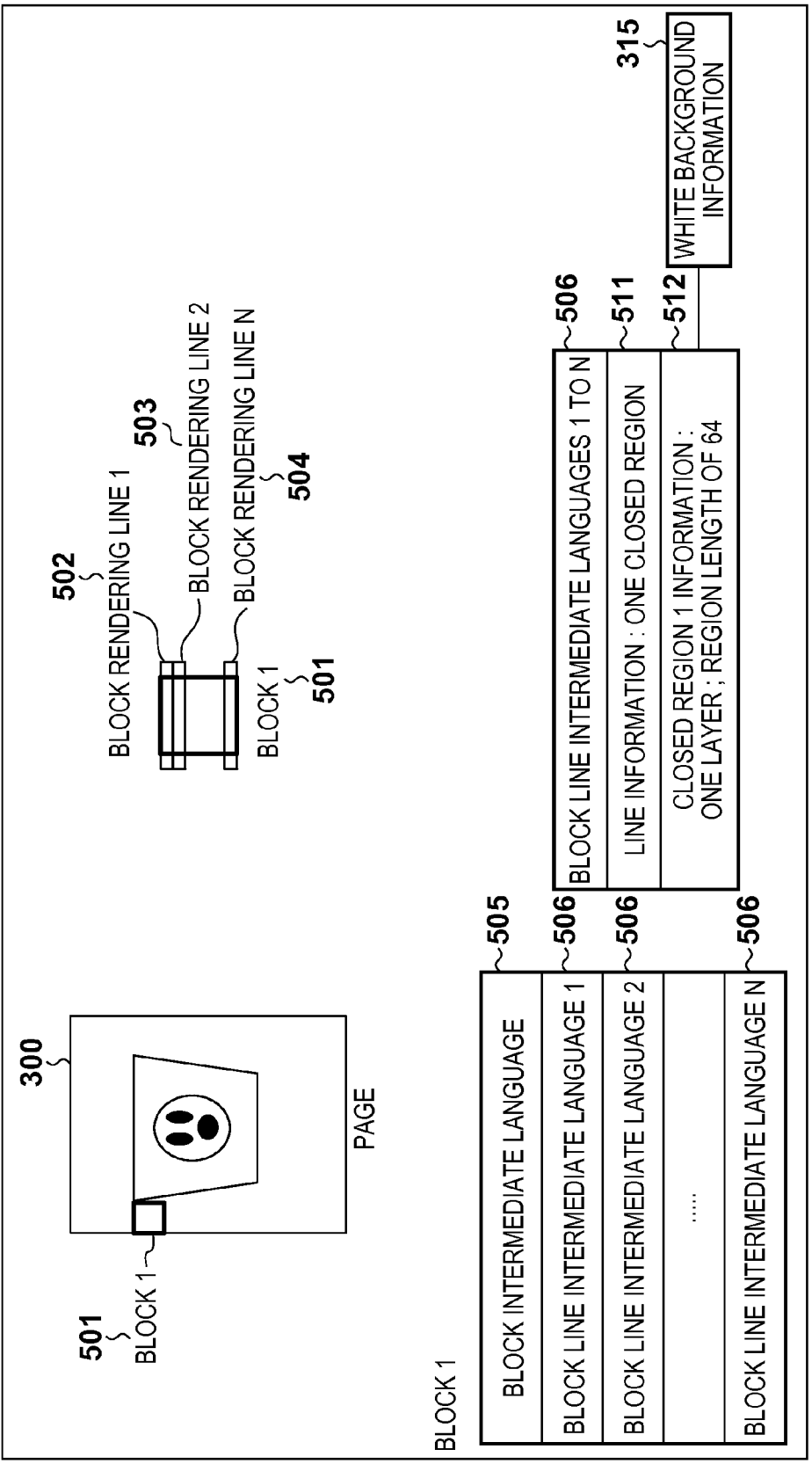
FIG. 5 is a view illustrating an example in which a speed-up method based on a scan line model is applied to image forming processing for each block.
Figure 6:
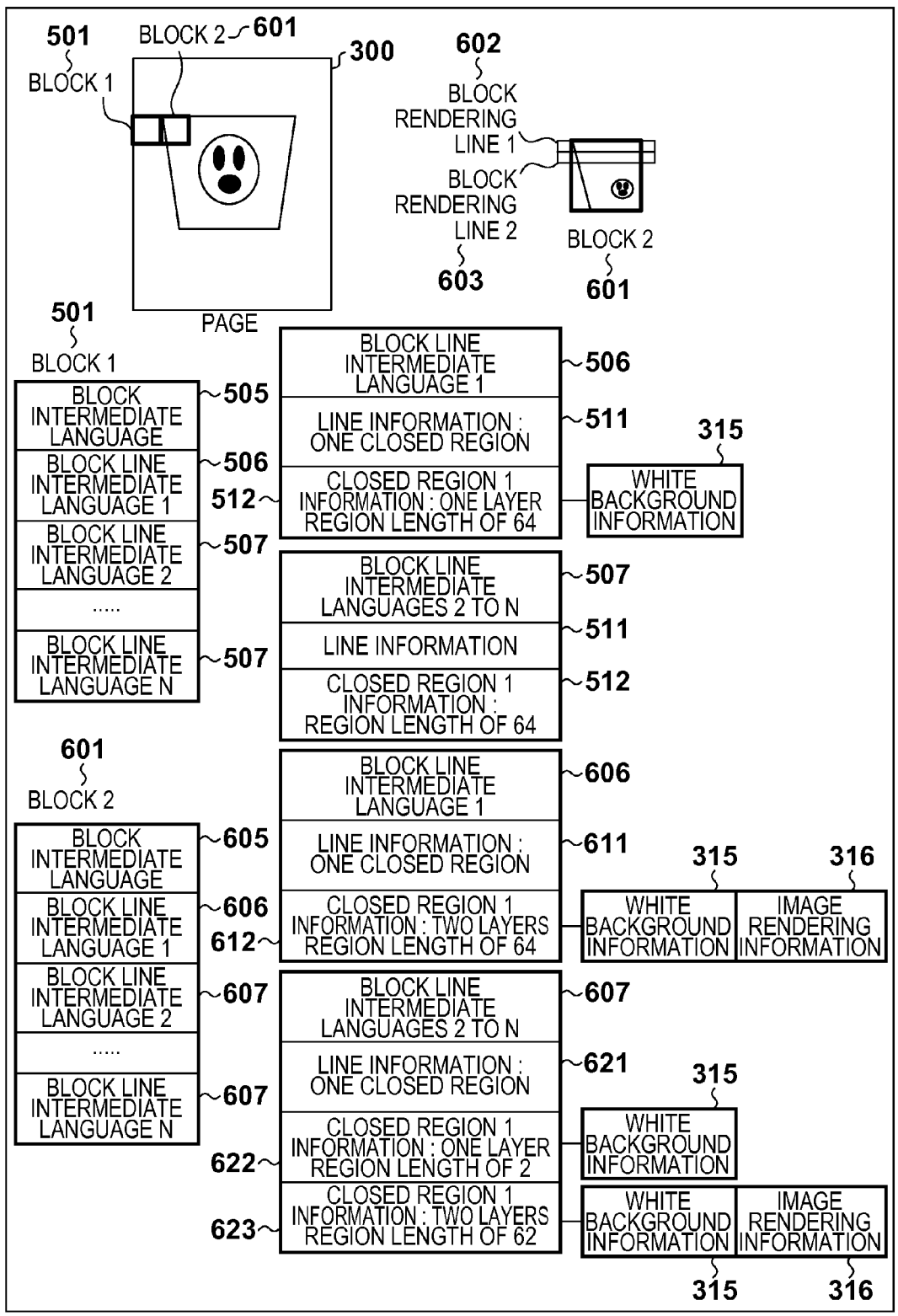
FIG. 6 is a view which serves to explain the problem to be solved and illustrates an example in which a speed-up method based on the scan line model is applied to image forming processing for each block.
Figure 7:
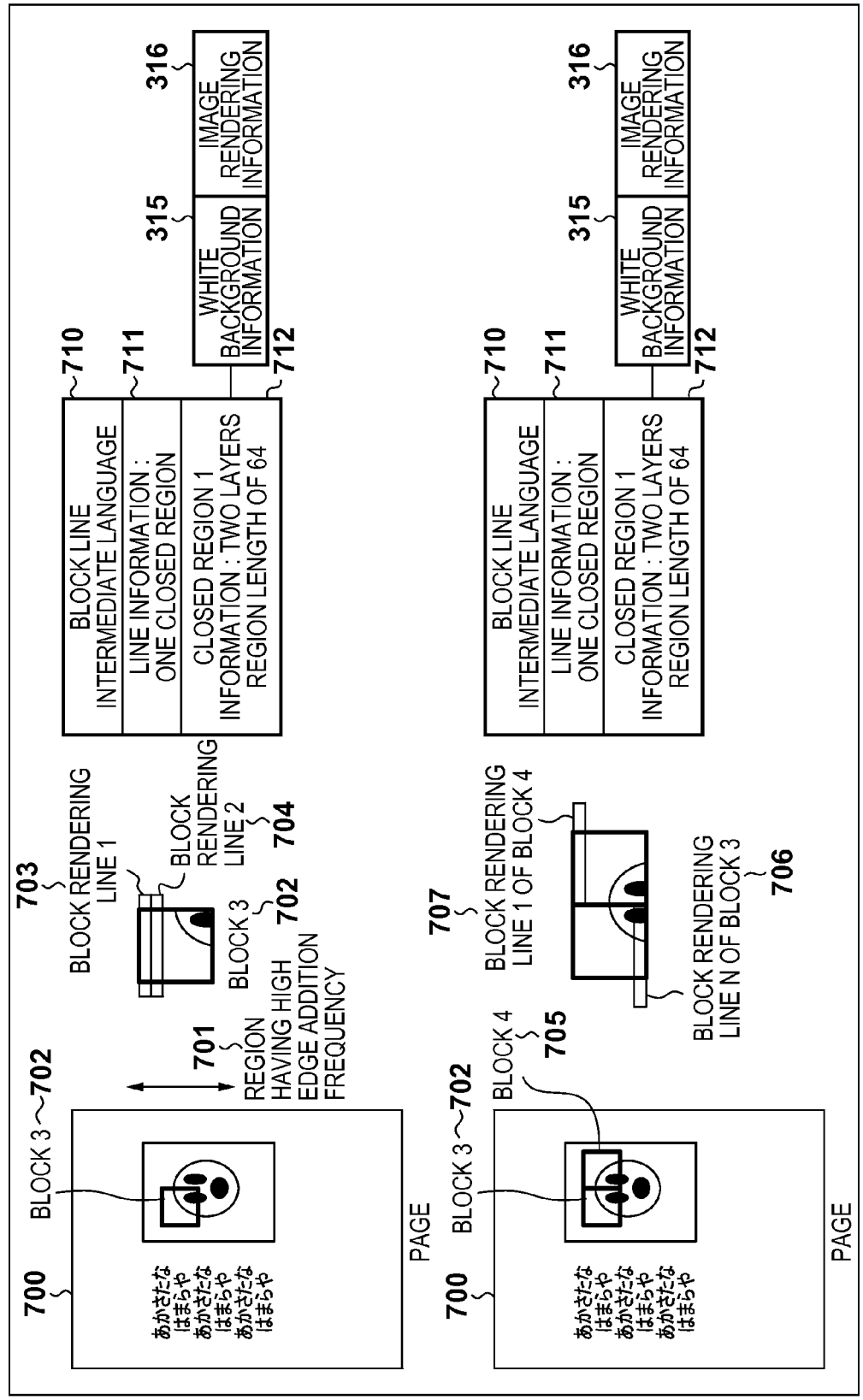
FIG. 7 is a view which serves to explain the problem to be solved and illustrates another example in which the speed-up method based on the scan line model is applied to image forming processing for each block.

For example, as shown in FIG. 5, a block 1 501 is formed by a plurality of block rendering lines 1 502, 2 503, ..., N 504. All the regions on the block rendering line 1 502 are rendered as a white background. Therefore, the block 1 501 is formed by line information 511 indicating one closed region, closed region information 512, and white background information 315, as shown in a block line intermediate language 506. Also, all block rendering lines 1, 2, ..., N have identical closed regions, a block intermediate language 505 is formed by N block line intermediate languages 506.

Although each block obtained by dividing input data is formed by 8×8 pixels in this embodiment, the present invention is not limited to this. Also, the input data includes at least one rendering object, as shown in the page 300 of FIG. 3. Hence, image data forms a plurality of layers.

Processing as a feature of the present invention will be described below assuming the above-mentioned related art as the background of the present invention.

Apparatus Configuration

An embodiment of the present invention will be described with reference to the accompanying drawings. An MFP (Multi Function Printer) such as an image forming apparatus 100 will be taken as an example in this embodiment. However, an SFP (Single Function Printer), an LBP (Laser Beam Printer), or printers of other print types may be used, as a matter of course.

Figure 1:
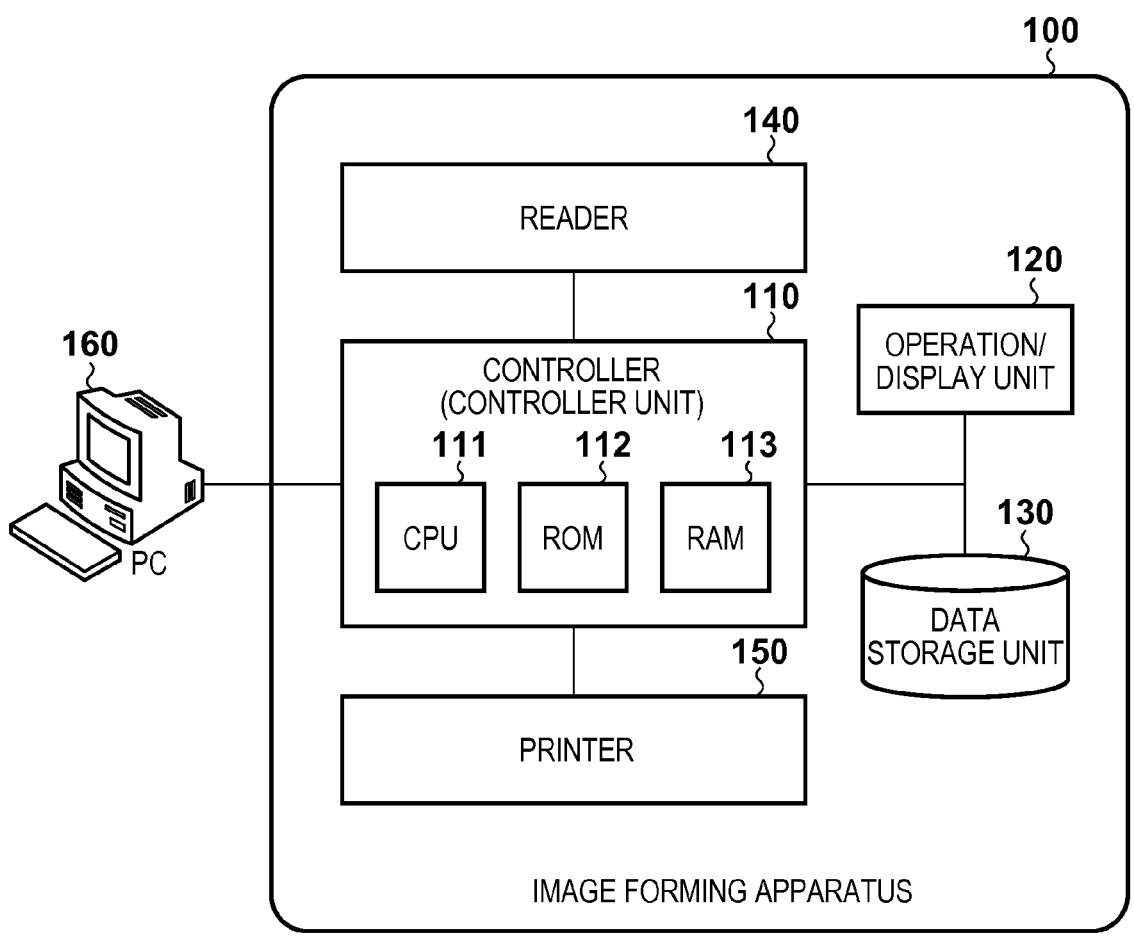
FIG. 1 is a block diagram showing an embodiment of an image forming apparatus.

FIG. 1 is a block diagram showing a configuration as an embodiment of an image forming apparatus including a controller as an electronic component according to the present invention. The image forming apparatus 100 is connected to a host computer (PC) 160 via a LAN (Local Area Network) such as Ethernet®. The image forming apparatus 100 includes a reader 140, a printer 150, an operation/display unit 120, a data storage unit 130, and a controller (controller unit) 110 which controls these constituent components.

The controller 110 includes, for example, a CPU 111, ROM 112, and RAM 113, and the CPU 111 systematically controls the overall image forming apparatus 100 based on programs stored in the ROM 112 or on other storage media. The controller 110 is configured to cause the CPU 111 to load predetermined programs for executing, for example, PDL interpretation processing/intermediate language generation processing and rendering processing. However, dedicated hardware (not shown) may be used for the rendering processing. The printer 150 outputs image data. The operation/display unit 120 includes a keyboard for operating various print settings to perform image output processing, and a liquid crystal panel for displaying, for example, operation buttons to perform image output settings.

The data storage unit 130 can store/retain image data, document data, and print data such as the print apparatus control language (for example, ESC codes or PDLs (Page Description Languages)). For example, the data storage unit 130 can store/retain image data/document/PDL received from the host computer (PC) 160 via the LAN, and image data read by controlling the reader 140.

A practical embodiment of the present invention will be described below by taking as an example an image forming apparatus having the configuration as described above. Also, the same configuration as described with reference to FIG. 2 is used as the software configuration in this embodiment.

Overall Processing Sequence

Figure 8:
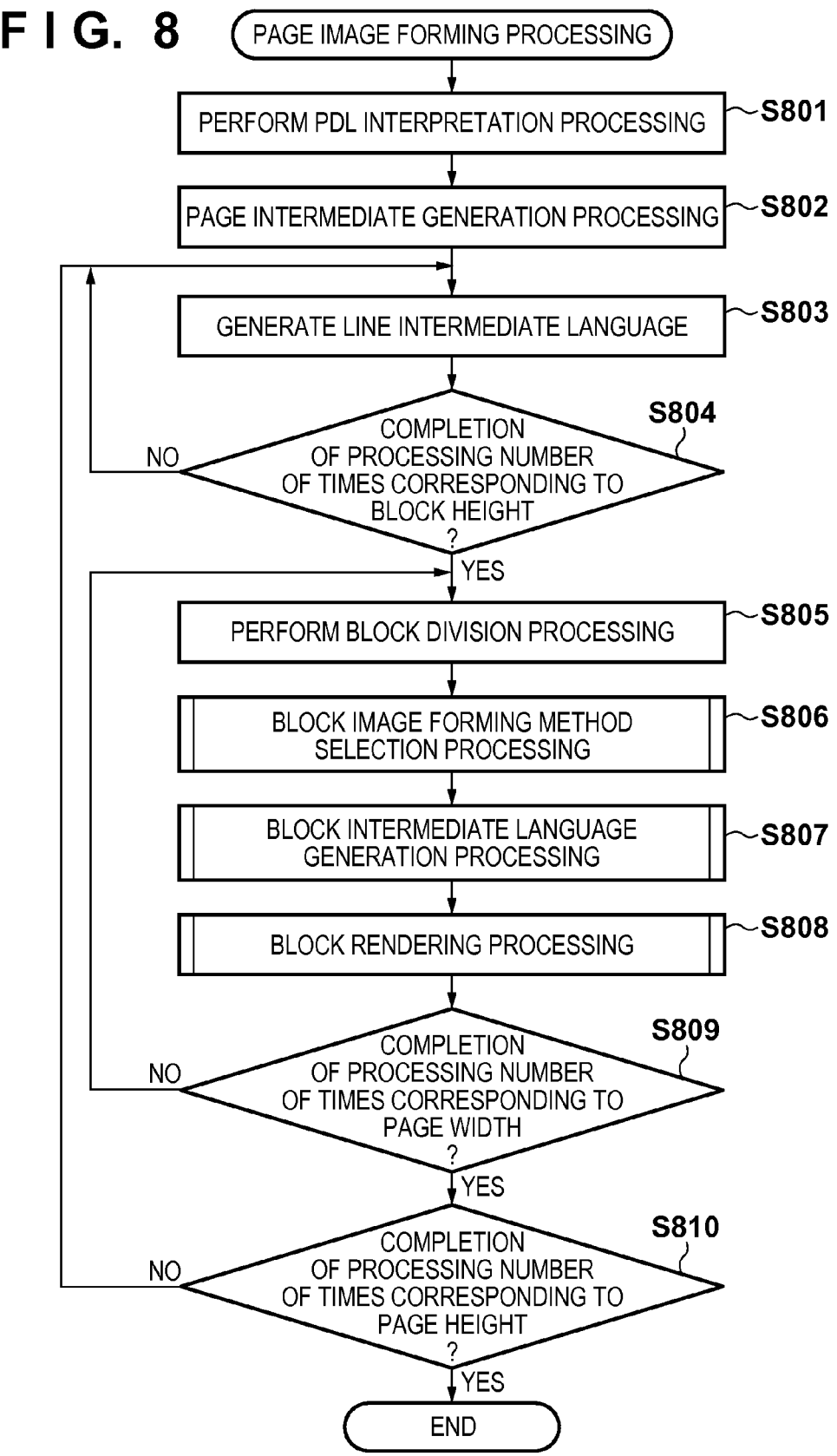
FIG. 8 is a flowchart showing a series of processing sequences of image forming processing for a page image by the image forming apparatus.

FIG. 8 is a flowchart showing a series of processing sequences of image forming processing for a page image by the image forming apparatus 100 in this embodiment. The CPU 111 installed on the image forming apparatus 100 reads out and executes a program stored in, for example, the ROM 112 as a storage unit to implement this processing. Also, each part which performs the processing is the same as shown in FIG. 2.

First, an instruction to print page image information specified in a PDL is transferred from the PC 160 to the image forming apparatus 100, and the image forming apparatus 100 stores the transferred PDL in the data storage unit 130. To perform image generation processing, the CPU 111 acquires the PDL from the data storage unit 130, and performs its interpretation processing (step S801).

The CPU 111 performs processing of generating a predetermined renderable page intermediate language from the interpreted PDL (step S802). The edge processing unit 200 implemented as part of the program loaded into the CPU 111 performs processing of generating a line intermediate language 212 based on the page intermediate language generated in step S802 (step S803). The edge processing unit 200 performs the processing until the processing of generating the line intermediate language 212 corresponding to a predetermined block height is completed (YES in step S804).

The block division unit 201 implemented as part of the program loaded into the CPU 111 performs block division processing of generating a block intermediate language 213 representing block data having a predetermined width and height, from the line intermediate language 212 corresponding to the predetermined block height (step S805).

The block division unit 201 performs block image forming method selection processing of analyzing the block intermediate language 213 generated in the block division processing (step S805), and determining an image forming method for the analyzed block (step S806). This processing will be described in more detail later with reference to FIG. 9.

The block division unit 201 adds identification information specifying the image forming method selected in the block image forming method selection processing (step S806), and performs processing of generating a block intermediate language 213 corresponding to the selected image forming method (step S807). This processing will be described in more detail later with reference to FIG. 15.

The closed region rendering unit 202 performs image forming processing of a predetermined block using the image forming method specified in the block intermediate language 213 generated in the block data intermediate language generation processing (step S807) to generate block pixel data 214 (step S808). This processing will be described in more detail later with reference to FIG. 18. The closed region rendering unit 202 may be implemented as either part of the program loaded into the CPU 111 or hardware installed on the controller (controller unit) 110.

The CPU 111 repeats the above-mentioned processing operations in steps S805 to S808 a number of times corresponding to the page width (step S809). Further, the CPU 111 repeats the processing operations in steps S803 to S809 (step S810) to perform processing of forming a page image.

Block Image Forming Method Selection Processing

Figure 9:
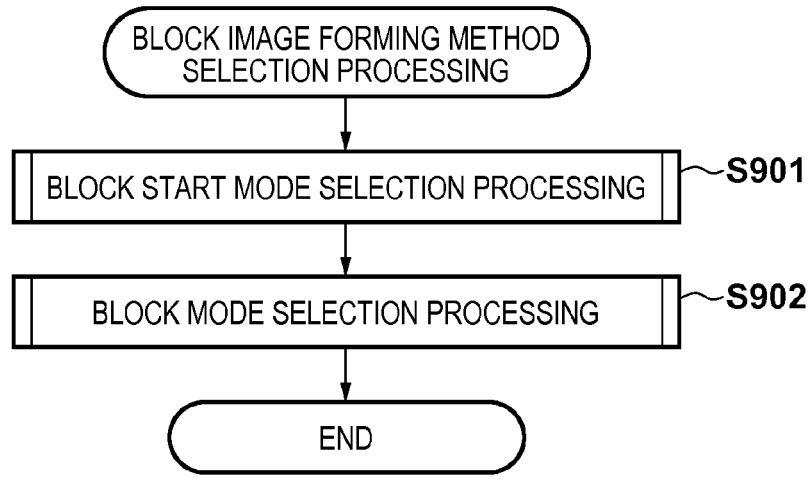
FIG. 9 is a flowchart showing the detailed sequence of block image forming method selection processing.

FIG. 9 is a flowchart showing the detailed sequence of the block image forming method selection processing (step S806) shown in FIG. 8 of this embodiment.

First, the block division unit 201 performs block start mode selection processing of selecting an image forming method for the start block line of a block to undergo image forming processing (step S901). In this embodiment, processing of determining whether the rendering information of the last block line of a block having undergone image formation last time can be used, for example, is performed. This processing will be described in more detail later with reference to FIG. 10. The block division unit 201 performs block mode selection processing of selecting an image forming method for the block to undergo image formation (step S902). In this embodiment, processing of determining whether and how the rendering information of the start block line can be used in forming an image of each block line included in the block, for example, is performed. This processing will be described in more detail later with reference to FIG. 12.

Block Start Mode Selection Processing

Figure 10:
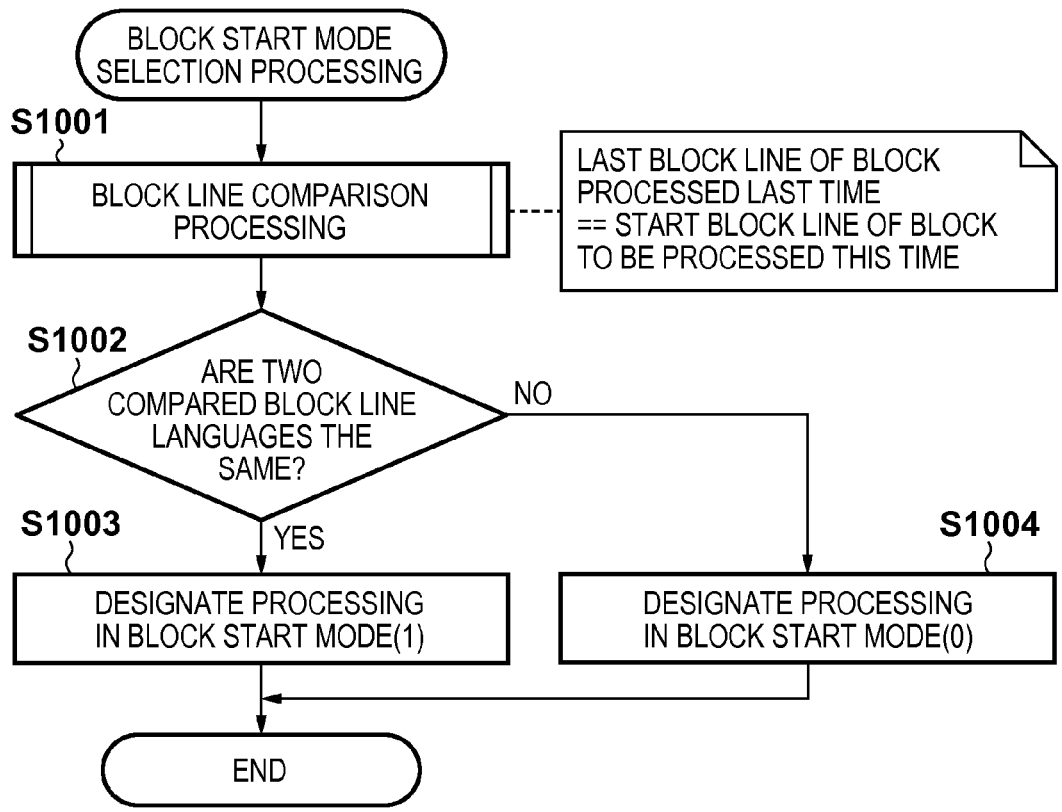
FIG. 10 is a flowchart showing the detailed sequence of block start mode selection processing.

FIG. 10 is a flowchart showing the detailed sequence of the block start mode selection processing (step S901) shown in FIG. 9 of this embodiment.

First, the block division unit 201 performs block comparison processing between the information of the last block line of the block having undergone image formation last time and that of the start block line of the block to undergo image formation this time (step S1001). This processing will be described in more detail later with reference to FIG. 11. The block division unit 201 determines whether the two block lines compared in the block line comparison processing (step S1001) have the same block line intermediate language (step S1002).

If the two block lines have the same block line intermediate language (YES in step S1002), the process advances to step S1003. In this case, the block division unit 201 determines that the information of the last block line of the block having undergone image formation last time can also be used in image forming processing of the start block line of the block to undergo image formation this time. Accordingly, the block division unit 201 performs predetermined setting ("1" is designated in this case) for a block start mode which allows identification of the determination result (step S1003). If the two block lines have different block line intermediate languages (NO in step S1002), the process advances to step S1004. In this case, the block division unit 201 determines that the information of the last block line of the block having undergone image formation last time cannot be used in image forming processing of the start block line of the block to undergo image formation this time. Accordingly, the block division unit 201 performs predetermined setting ("0" is designated in this case) for a block start mode which allows identification of the determination result (step S1004).

Block Line Comparison Processing

FIG. 11 is a flowchart showing the detailed sequence of the block line comparison processing (steps S1001 & S1305) shown in FIGS. 10 and 13 of this embodiment.

First, the block division unit 201 determines whether the two compared block lines have the same number of closed regions (step S1101). If the two compared block lines have the same number of closed regions (YES in step S1101), the process advances to step S1102. However, if the two compared block lines have different numbers of closed regions (NO in step S1101), the process advances to step S1105, in which the block division unit 201 determines that the two compared block lines are different. The block division unit 201 holds the determination result obtained at this time.

The block division unit 201 determines whether all the combinations of layers held in the closed regions included in the block line are the same (step S1102). If it is determined that all the combinations of layers held in the closed regions included in the block line are the same (YES in step S1102), the process advances to step S1103. However, if it is determined that not all the combinations of layers held in the closed regions included in the block line are the same (NO in step S1102), the process advances to step S1105, in which the block division unit 201 determines that the two compared block lines are different. The block division unit 201 holds the determination result obtained in this case. The block division unit 201 repeats the determination processing in step S1102 a number of times corresponding to the number of closed regions included in the block line (step S1103). If the combinations of layers in all the closed regions are the same (YES in step S1103), the process advances to step S1104, in which the block division unit 201 determines that the two compared block lines are identical, and block lines including closed regions having the same components continue (step S1104). The block division unit 201 holds the determination result obtained in this case.

Block Mode Selection Processing

FIG. 12 is a flowchart showing the detailed sequence of the block mode selection processing (step S902) shown in FIG. 9 of this embodiment. Also, FIGS. 14A, 14B, and 14C are views showing the concept of block intermediate languages generated in accordance with the components of each block according to the above-mentioned related art.

Referring to FIG. 12, the block division unit 201 performs processing of determining the components of the block to undergo image forming processing first (step S1201). This processing will be described in more detail later with reference to FIGS. 13A and 13B. In this embodiment, in the block component determination processing (step S1201), it is determined whether, for example, the numbers of closed regions on individual block lines and the combinations of layers included in the respective closed regions are the same.

The block division unit 201 determines whether the number of identical block lines acquired in the block component determination processing (step S1201) is equivalent to the height of the block (the number of block lines) to undergo image forming processing (step S1202). This indicates that it is determined in this determination processing whether the numbers of closed regions on all block lines included in the block, and the combinations of layers included in the respective closed regions are the same.

Figure 14A:
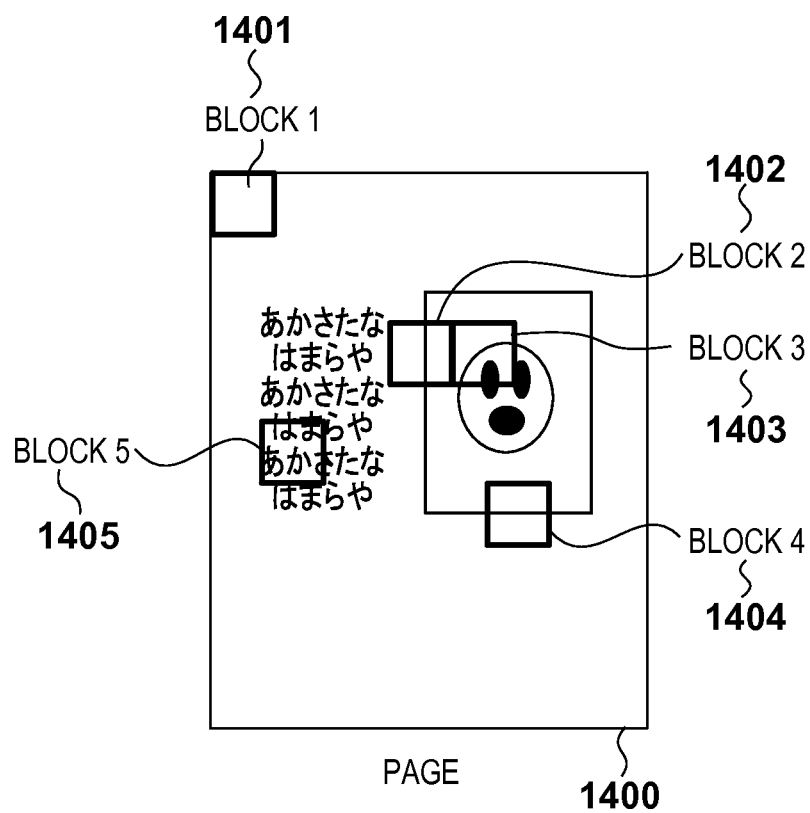
Figure 14B:
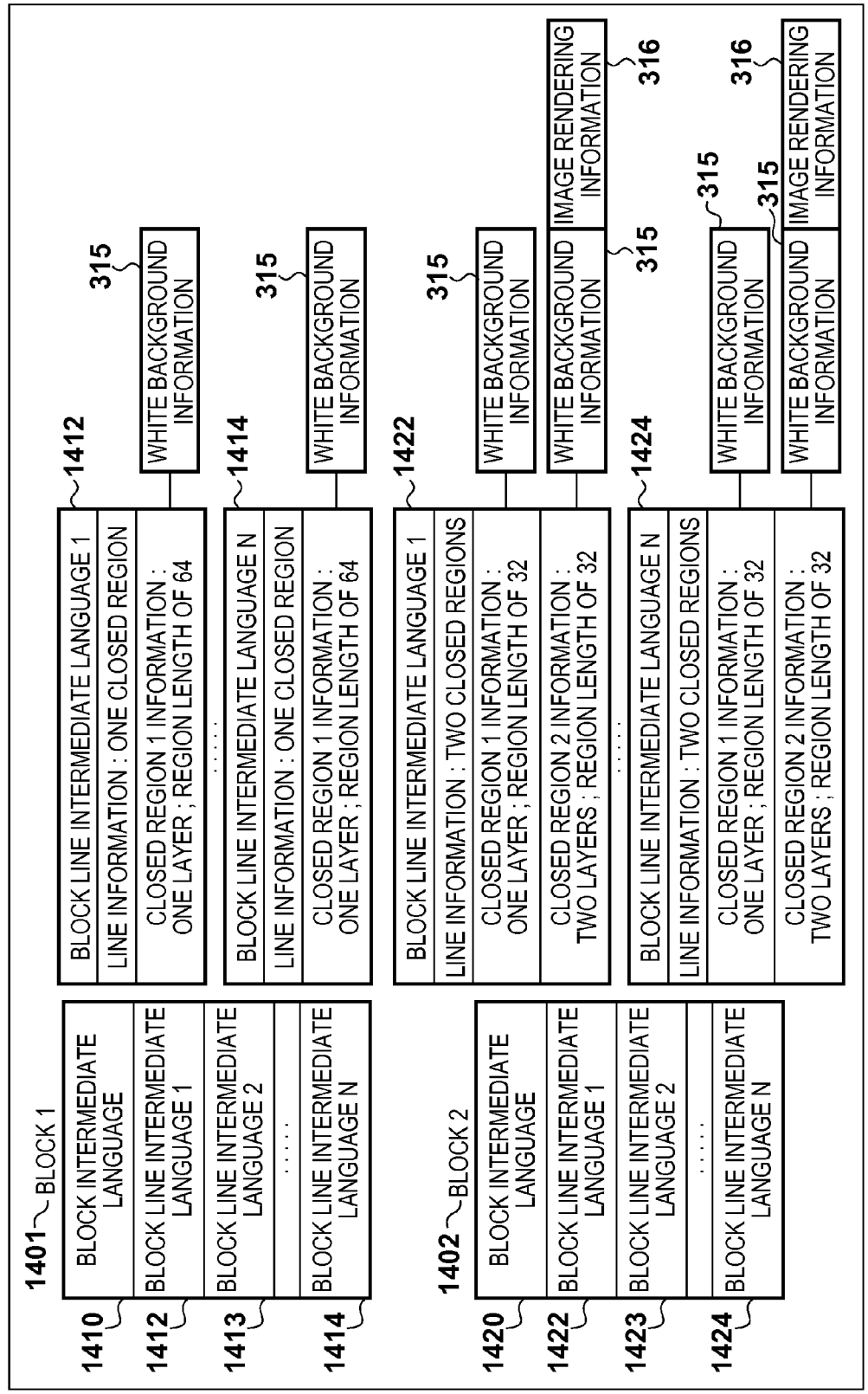

For example, in the related art, the block line intermediate languages of block lines included in a block 2 1402 shown in FIGS. 14A, 14B, and 14C take the forms of block line intermediate languages 1422 to 1424, respectively. At this time, the numbers of closed regions in the block line intermediate languages 1422 to 1424, and the combinations of layers included in the respective closed regions are the same. Therefore, in such a case, the information of the block line intermediate language 1 1422 for the block start line can also be used for the second and subsequent block lines. Also, the block line intermediate languages of block lines included in a block 3 1403 shown in FIGS. 14A, 14B, and 14C take the forms of block line intermediate languages 1432 to 1434, respectively. Similarly, at this time, the numbers of closed regions in the block line intermediate languages 1432 to 1434, and the combinations of layers included in the respective closed regions are the same. Therefore, in such a case, the information of the block line intermediate language 1 1432 for the block start line can also be used for the second and subsequent block lines.

In the determination processing (steps S1202 & S1203), the block division unit 201 determines whether the block to undergo image forming processing has components which can optimize the number of closed regions and the layer information in each closed region. The block division unit 201 sets a block mode which allows identification to that effect ("2" is set in this case) (step S1206).

The block division unit 201 determines whether the number of MAX closed regions acquired in the block component determination processing (step S1201) is "1", and the value of ImageFlag information is "FALSE" (step S1203). This indicates that it can be determined in step S1203 whether the number of closed regions on all block lines included in the block is "1", and the combinations of layers included in the respective closed regions are the same and include only a single-color layer. Upon this operation, the block pixel data 214 in the block can be represented using only a single color.

For example, the block line intermediate languages of block lines included in a block 1 1401 shown in FIGS. 14A, 14B, and 14C take the forms of block line intermediate languages 1412 to 1414, respectively. At this time, all the block line intermediate languages 1412 to 1414 specify white rendering. Therefore, the block can be represented using only a single color. In this case, the block division unit 201 determines that an image of the block can be formed using single-color information without particularly holding the information of closed regions (YES in step S1203), and a block mode which allows identification to that effect is set ("1" is set in this case) (step S1205).

The block division unit 201 determines whether the number of identical block lines acquired in the block component determination processing (step S1201) is equal to or larger than a predetermined number (step S1204). This indicates that it is determined in the determination processing in step S1204 whether the numbers of closed regions and the combinations of layers included in the respective closed regions are the same for a predetermined number, if not all, of block lines included in the block. The predetermined number mentioned herein is defined in advance and held in the storage unit.

For example, the block line intermediate languages of block lines included in a block 4 1404 shown in FIGS. 14A, 14B, and 14C take the forms of block line intermediate languages 1442 to 1445, respectively. At this time, the numbers of closed regions in the block line intermediate languages 1442 to 1445, and the combinations of layers included in the respective closed regions are the same for the first to (M−1)th block lines. Therefore, in such a case, the information of block line intermediate language 1 of the block start line can also be used for the first to (M−1)th block lines.

If the block division unit 201 determines whether the block to undergo image forming processing has components which can optimize the number of closed regions and the layer information in each closed region for the first to (M−1)th lines (YES in step S1204), it sets a block mode which allows identification to that effect ("3" is set in this case) (step S1207). However, if the number of identical block lines is smaller than the predetermined number (NO in step S1204), the block division unit 201 determines that optimization as mentioned earlier is impossible, and sets a block mode in which a block line intermediate language is generated ("4" is set in this case) (step S1208).

Lastly, the block division unit 201 performs processing of holding the line intermediate language of the last block line in itself to perform block start mode selection processing (step S901) of the next block (step S1209).

Block Component Determination Processing

Figure 13A:
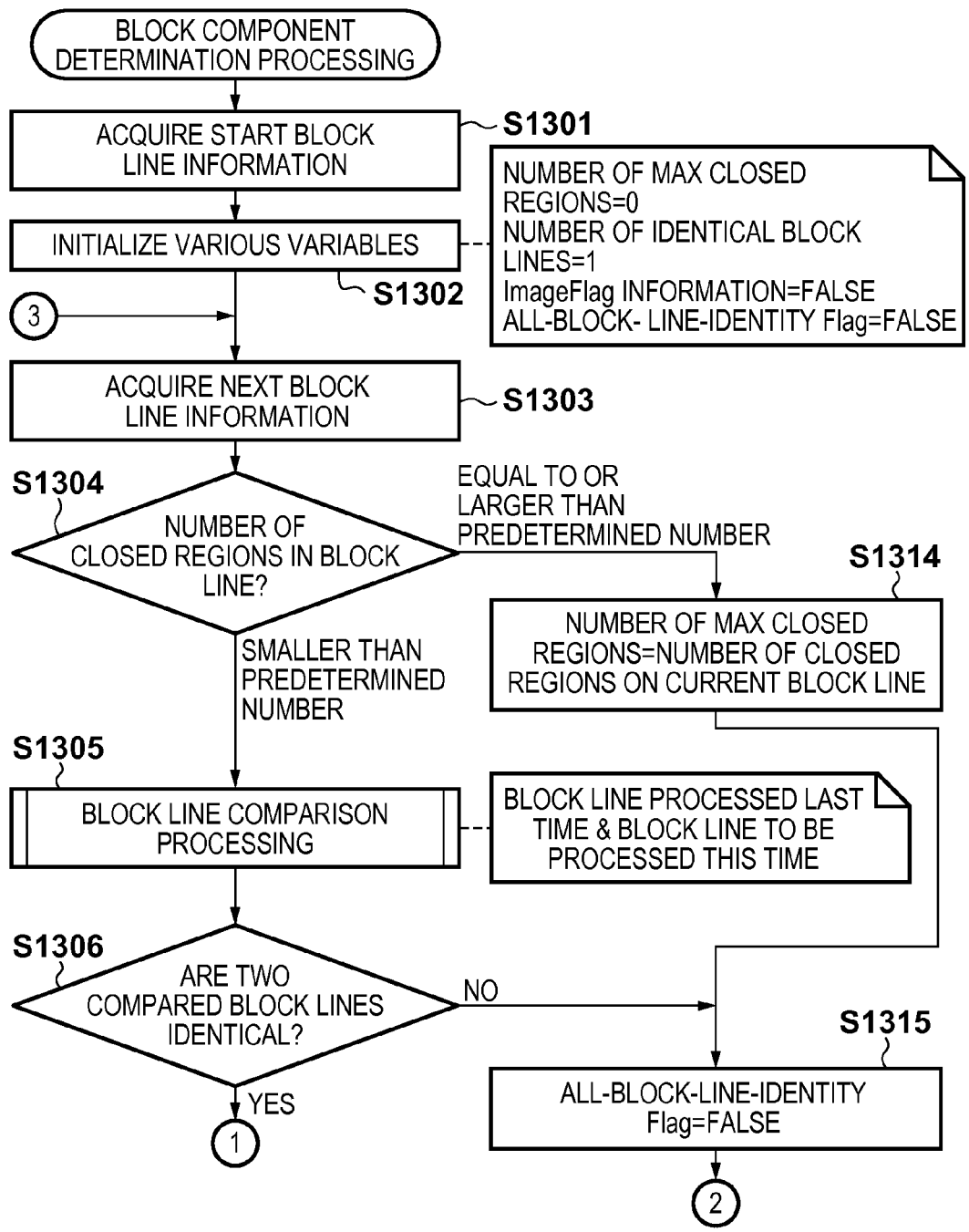
FIGS. 13A and 13B are flowcharts showing the detailed sequence of block component determination processing.
Figure 13B:
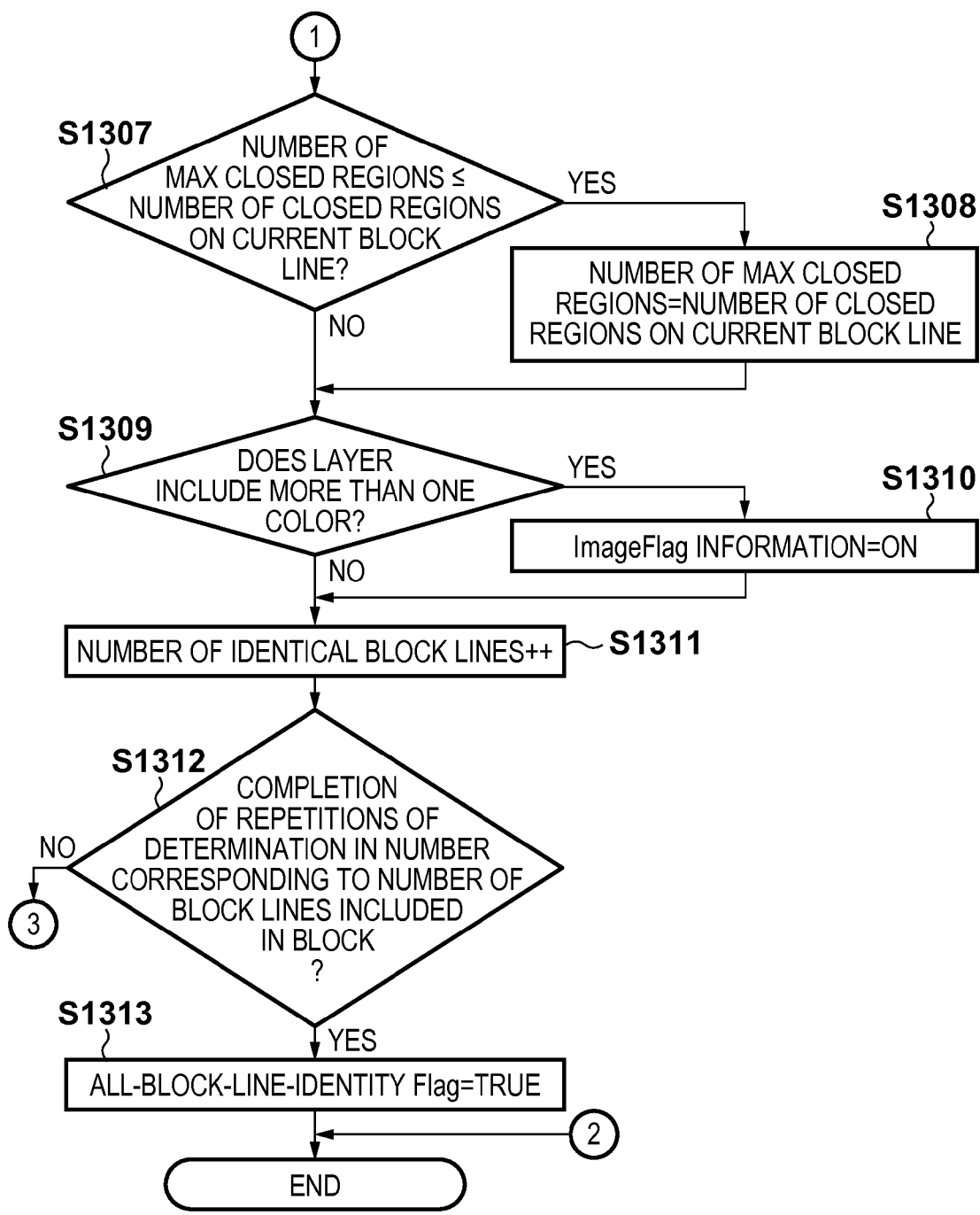

FIGS. 13A and 13B are flowcharts showing the detailed sequence of the block component determination processing (step S1201) shown in FIG. 12 of this embodiment.

The block division unit 201 acquires the information of the start block line of the block to undergo image formation first (step S1301). The block division unit 201 initializes various variables which store the component information of the block to be determined in block component determination processing (step S1302). The variables initialized at this time include the number of MAX closed regions, the number of identical block lines, the ImageFlag information, and the all-block-line identity Flag. These variables will be described herein. The number of MAX closed regions indicates the number of maximum closed regions having a largest number of closed regions on each block line included in the block. The number of identical block lines indicates the number of identical block lines among the block lines included in the block. The ImageFlag information indicates whether the block represents an image. The all-block-line identity Flag indicates whether all block lines included in the block are identical.

The block division unit 201 acquires the next block line information (step S1303). The block division unit 201 compares the numbers of closed regions on the block line acquired last time and that acquired in step S1303 (step S1304). For the first processing of the block, the block division unit 201 identifies the numbers of closed regions on both the start block line and the next block line. At this time, if it is determined that the number of closed regions is equal to or larger than a predetermined number, the block division unit 201 updates the number of MAX closed regions (step S1314), and the process advances to step S1315. However, if it is determined that the number of closed regions is smaller than the predetermined number, the process advances to step S1305, in which the block division unit 201 performs block line comparison processing between the block line processed last time and that to be processed this time. The block line comparison processing in this case is the same as described with reference to FIG. 11. Note that the information of the predetermined number used in step S1304 is defined in advance and held in the storage unit.

The block division unit 201 determines whether the two block lines compared in the block line comparison processing in step S1305 are identical (step S1306). If it is determined that the two compared block lines are identical (YES in step S1306), the process advances to step S1307. However, if the two compared block lines are different (NO in step S1306), the process advances to step S1315, in which the block division unit 201 performs processing of updating the all-block-line-identity Flag (step S1315). In this update processing, "FALSE" is substituted for the all-block-line-identify Flag.

The block division unit 201 compares the number of closed regions on the current block line with the number of MAX closed regions (step S1307). If the number of closed regions on the current block line is equal to or larger than the number of MAX closed regions (YES in step S1307), the process advances to step S1308, in which the block division unit 201 updates the number of MAX closed regions (step S1308). In this update processing, the number of closed regions on the current block line is substituted for the number of MAX closed regions. The process then advances to step S1309. If the number of closed regions on the current block line is smaller than the number of MAX closed regions (NO in step S1307), the process advances to step S1309.

The block division unit 201 determines whether the block line to be processed includes a layer other than a single-color layer (step S1309). If it is determined that the block line to be processed includes a layer other than a single-color layer (YES in step S1309), the process advances to step S1310, in which the block division unit 201 performs processing of updating the ImageFlag information (step S1310). In this update processing, "ON" is substituted for the ImageFlag information. The process then advances to step S1311. If it is determined that the block line to be processed includes no layer other than a single-color layer (NO in step S1309), the process advances to step S1310. The block division unit 201 performs processing of updating the number of identical block lines (step S1311).

The block division unit 201 determines whether repetitions of determination processing in a number corresponding to the number of lines included in the block are complete (step S1312). If it is determined that the repetitions are incomplete (NO in step S1312), the process returns to step S1303, in which the block division unit 201 repeats determination processing a number of times corresponding to the number of block lines. However, if it is determined that these repetitions are complete (YES in step S1312), the process advances to step S1313, in which the block division unit 201 updates the all-block-line-identity Flag (step S1313). In this update processing, "TRUE" is substituted for the all-block-line-identity Flag.

Block Intermediate Language Generation Processing

Figure 15:
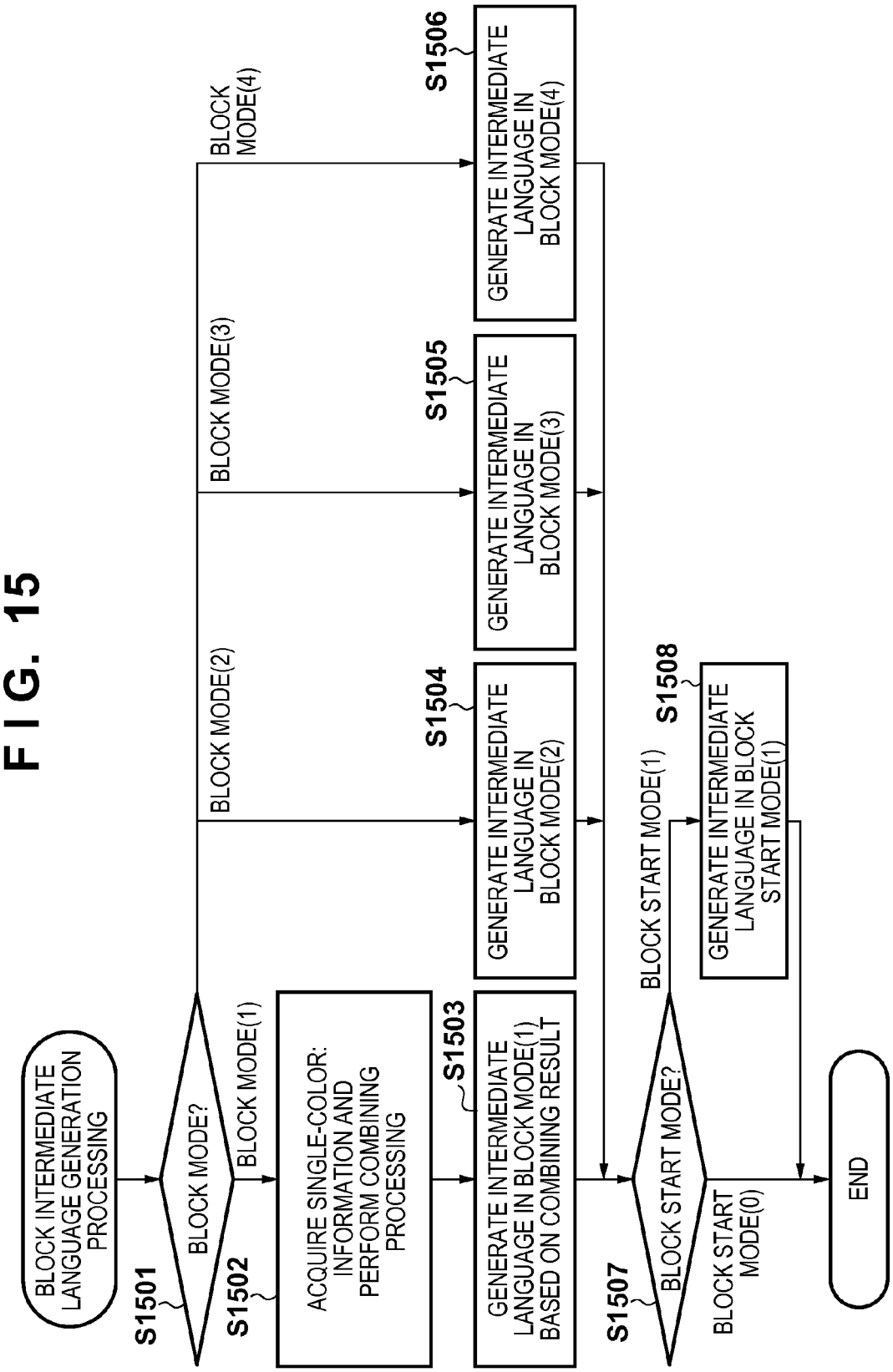
FIG. 15 is a flowchart showing the detailed sequence of block intermediate language generation processing.

FIG. 15 is a flowchart showing the detailed sequence of the block intermediate language generation processing (step S807) shown in FIG. 8 of this embodiment. Also, FIGS. 16A, 16B, and 16C are views showing the concept of the block intermediate language of each block, which is generated upon the block intermediate language generation processing.

Figure 16B:
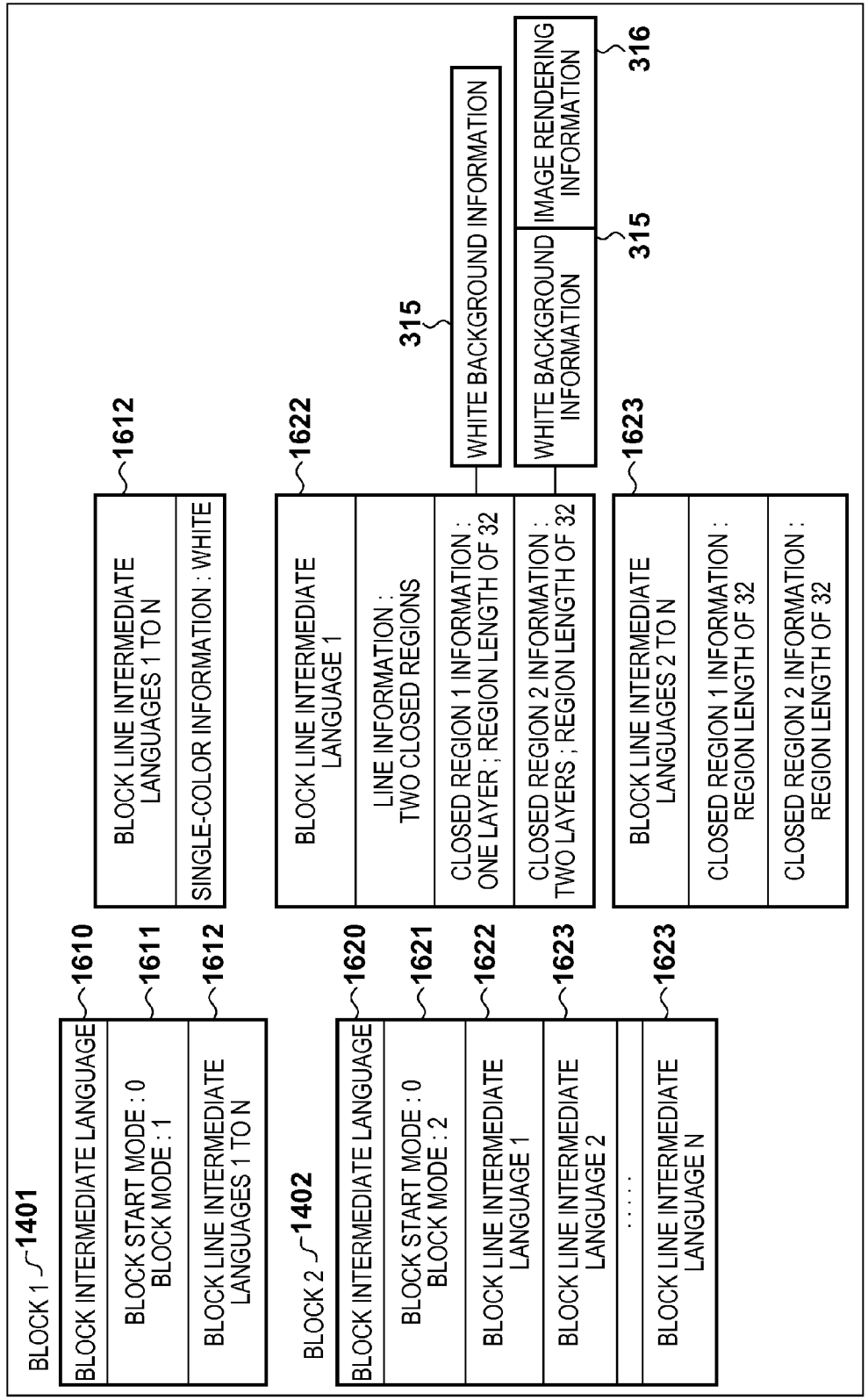
Figure 16C:
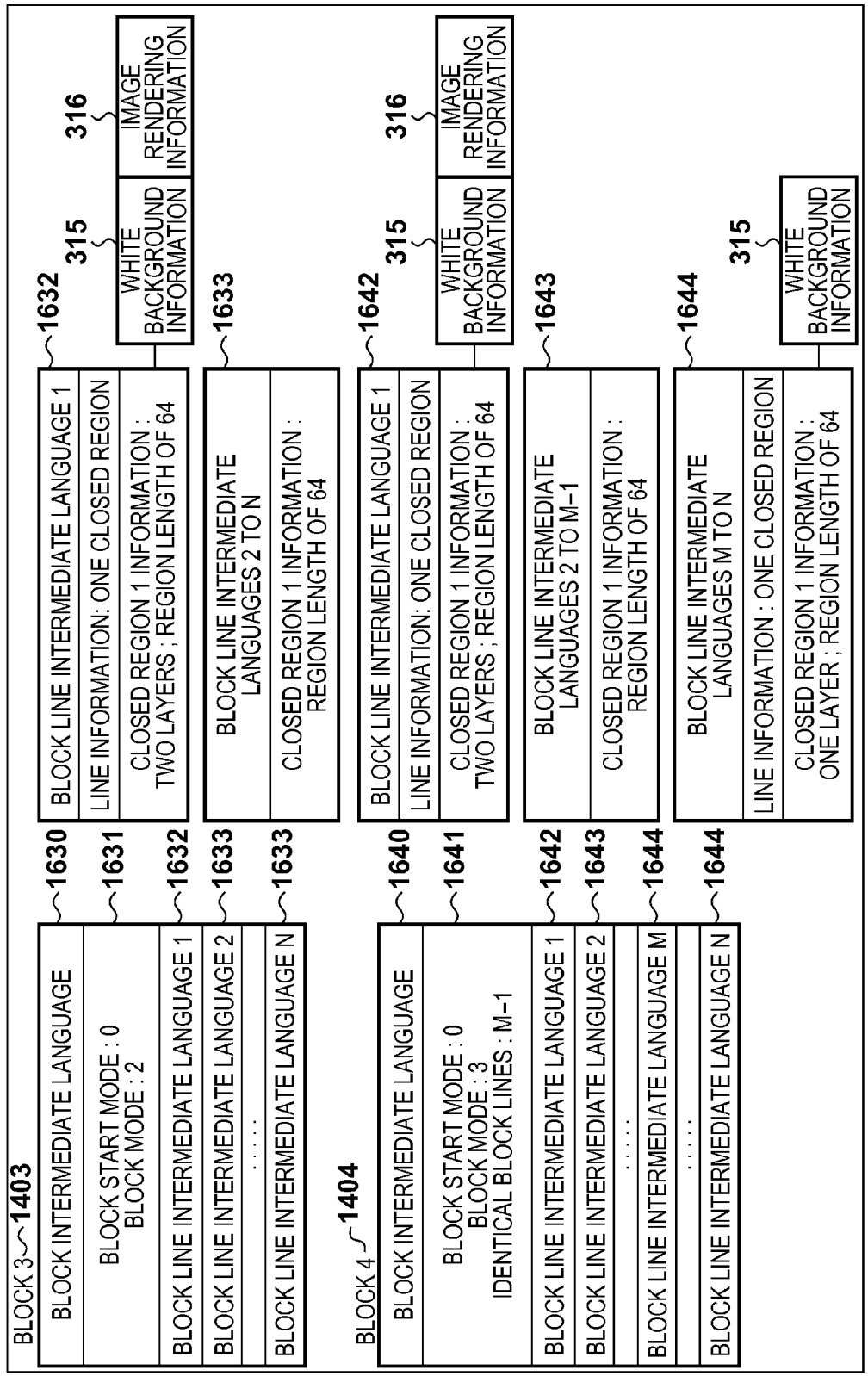
Figure 17:
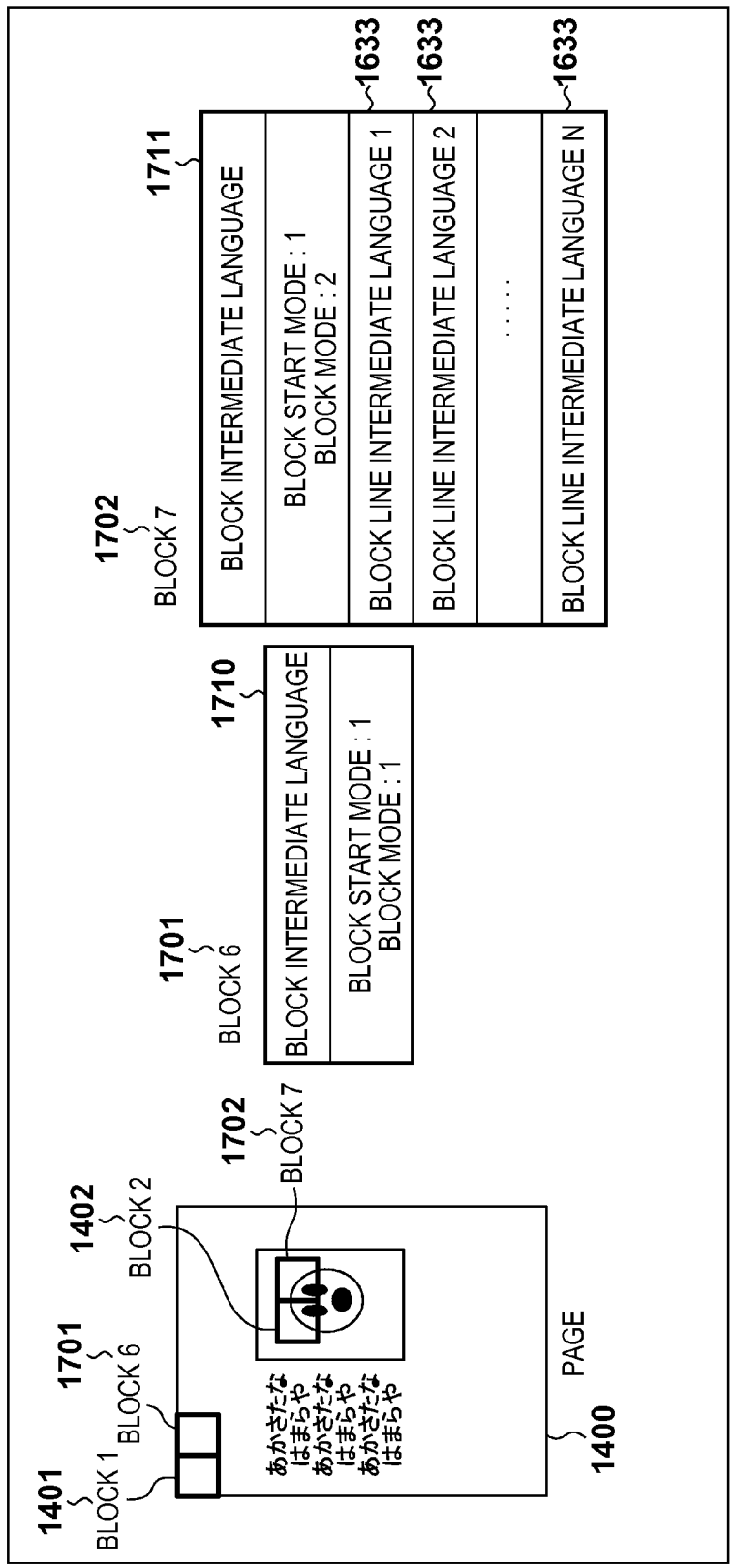
FIG. 17 is a view showing the concept of the block intermediate language of each block, which is generated upon the block intermediate language generation processing.

Note that as a feature of the block intermediate language in this embodiment, the data structure shown in FIGS. 16A, 16B, and 16C includes information indicating the components of the block intermediate language of each block, unlike the conventional data structure shown in FIGS. 14A, 14B, and 14C. FIGS. 16A, 16B, and 16C show the data structure of a block intermediate language based on the determination result of the components of each block line included in the block. The use of this information makes it possible to specify the type of data structure in performing rendering processing using the block intermediate language. Also, the use of a data structure unique to the present invention can serve as an index for selecting an image generation method while reducing the amount of data of the intermediate language. FIG. 17 also shows a data structure as a feature in this embodiment. The data structures shown in FIGS. 16 and 17 will be described in more detail later, together with flowcharts.

First, the block division unit 201 performs processing of determining a value selected as the block mode selected in the block mode selection processing (step S902) shown in FIG. 12 (step S1501). The block division unit 201 performs processing of generating a block intermediate language corresponding to the block mode selected in the block image forming method selection processing (step S806) shown in FIG. 9. First, if "1" is set as the block mode, the block of this block mode can be represented by single-color information. Therefore, the block division unit 201 performs processing of calculating the single-color information of the block from the layer information included in each closed region (step S1502). In the case of, for example, the block 1 1401 shown in FIGS. 16A, 16B, and 16C, white is calculated.

The block division unit 201 performs processing of generating a block intermediate language 1610 corresponding to the calculated single-color information and the block mode selected in the block image forming method selection processing (step S806) (step S1503). In the case of, for example, the block 1 1401, a block intermediate language 1610 formed by a block line intermediate language 1612 indicating the single-color information and a block line intermediate language 1611 indicating the block mode is generated.

If "2" is set as the block mode, an image of the block corresponding to this block mode can be formed using only the block line intermediate language of the start line of this block, in accordance with the result of the determination processing (step S1202). Therefore, the block division unit 201 performs processing of generating a block intermediate language 1620 by the block line intermediate language of the start line of this block (step S1504).

In the case of the block 2 1402, the block intermediate language 1620 is configured to hold a block line intermediate language 1622 of the start line of this block. Also, the block intermediate language 1620 is formed by block line intermediate languages 2 to N 1623 specifying block line image formation using the block line intermediate language 1622. Moreover, the block intermediate language 1620 is generated as a block intermediate language to which information indicating a block mode 1621 is added.

In the case of the block 3 1403, the block intermediate language 1620 is configured to hold a block line intermediate language 1632 of the start line of this block. Also, the block intermediate language 1620 is formed by block line intermediate languages 2 to N 1633 specifying block line image formation using the block line intermediate language 1632. Moreover, the block intermediate language 1620 is generated as a block intermediate language to which a block line intermediate language 1631 indicating a block mode is added.

If "3" is set as the block mode, images of the first block line to a predetermined block line in the block corresponding to this block mode can be formed using the block line intermediate language of the start line of this block, in accordance with the result of the determination processing (step S1204). Therefore, the block division unit 201 performs processing of generating a block intermediate language 1640 by the block line intermediate language of the start line of the block and the block line intermediate languages of block lines subsequent to the predetermined block line (step S1505).

In the case of, for example, the block 4 1402, the block intermediate language 1640 is formed by a block line intermediate language 1642 of the start line of this block and block line intermediate languages 2 to M−1 1643 specifying image formation using the block line intermediate language 1642. Also, the block intermediate language 1640 is formed by block line intermediate languages M to N 1644 specifying image formation of block lines subsequent to the predetermined block line. The block lines subsequent to the predetermined block line mean herein block lines subsequent to the last one of identical block lines. Moreover, the block intermediate language 1640 is generated as a block intermediate language to which a block line intermediate language 1641 indicating a block mode is added.

If "4" is set as the block mode, the block division unit 201 generates a block intermediate language by block line intermediate languages corresponding to all block lines, as described in the related art.

The block division unit 201 performs processing of determining a value selected as the block mode selected in the block mode selection processing (step S901) shown in FIG. 10 (step S1507). If "1" is set as the block start mode, the block division unit 201 performs processing of generating a block intermediate language by optimizing the block intermediate language of the start block line in the block as well (step S1508). When an image of, for example, a block 6 1701 shown in FIG. 17 is to be formed, the block intermediate languages of both the block 1 1401 and block 6 1701 take the form of the block intermediate language 1610. Therefore, since block line intermediate languages 1 to N are the same, the block division unit 201 performs processing of regenerating a block intermediate language 1710 by omitting single-color information (step S1508).

Also, when an image of a block 7 1702 is to be formed, the block intermediate languages of both the block 3 1403 and block 7 1702 take the form of a block intermediate language 1630. Therefore, since block line intermediate languages 1 to N are the same, the block division unit 201 performs processing of generating a block intermediate language 1711 specifying the use of the block line intermediate language of the start block line of the block 3 1403 (step S1508). Note that the block intermediate languages 1710 and 1711 of blocks 6 and 7 include the information of a block start mode set to "1", as shown in FIG. 17. That is, the block intermediate languages 1710 and 1711 are the data of intermediate languages indicating that the components of the first block line of the block to be processed this time are identical to those of closed regions on the last block line of the block processed last time.

Block Rendering Processing

Figure 18:
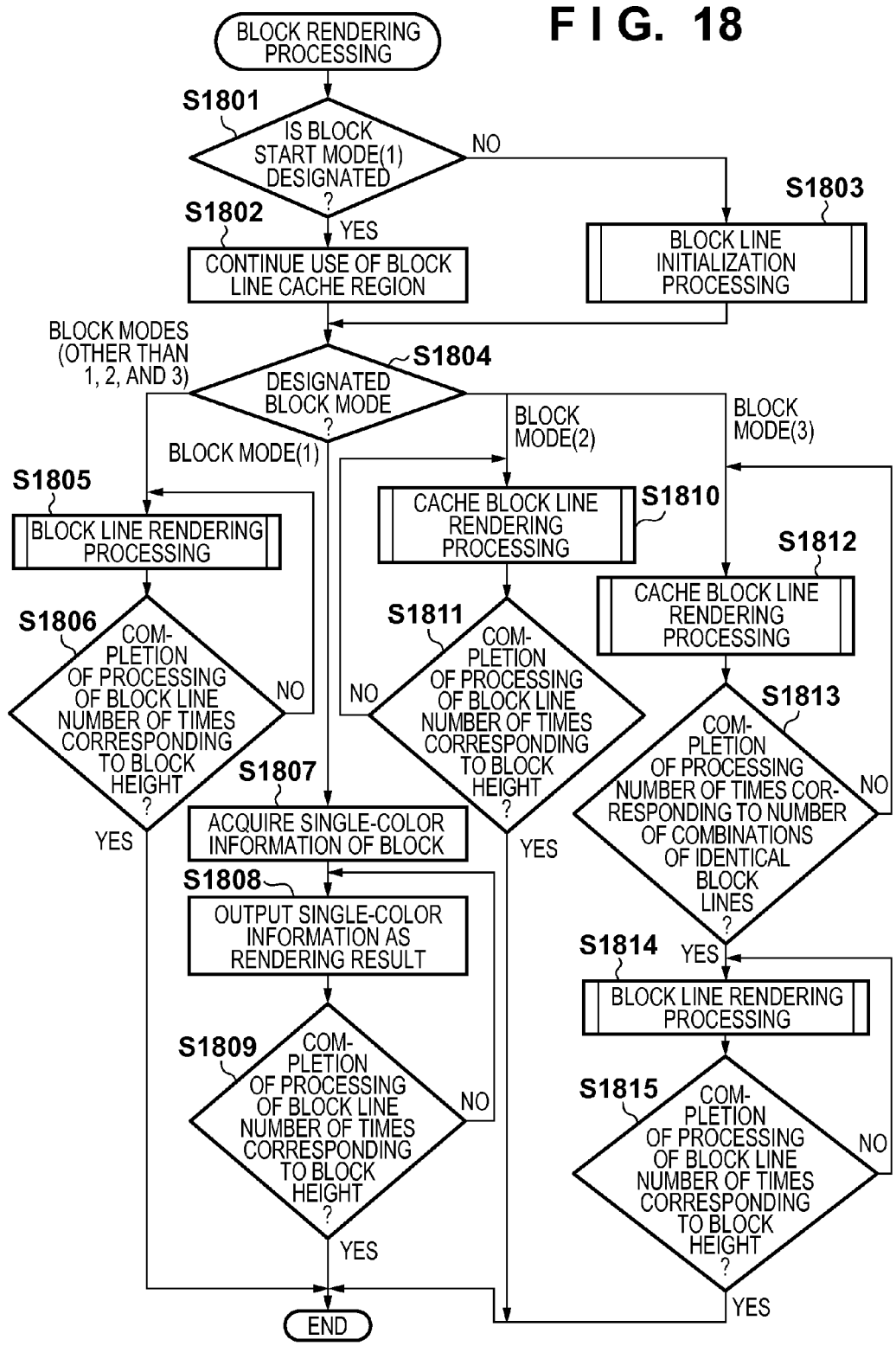
FIG. 18 is a flowchart showing the detailed sequence of block rendering processing.

FIG. 18 is a flowchart showing the detailed sequence of the block rendering processing (step S808) shown in FIG. 8 of this embodiment.

First, the closed region rendering unit 202 determines a value designated as the block start mode included in the block intermediate language (step S1801). If "1" is designated (YES in step S1801), the process advances to step S1802. The closed region rendering unit 202 determines that region information called a cache block line which stores the block line information of the last block line of a block having undergone image forming processing last time is to be used in forming an image of the current block (step S1802). In this case, block line initialization processing (step S1803) has already been performed in image forming processing of the previous block (step S1803), and continuous use of the block line cache region is determined, so necessary information has already been stored on the cache block line. However, if a value other than "1" (that is, "0") is set (NO in step S1801), the process advances to step S1803, in which the closed region rendering unit 202 performs block line initialization processing (step S1803). This processing will be described in more detail later with reference to FIG. 19. In this processing, the closed region rendering unit 202 performs initialization processing such as conversion into a format that can be processed in itself, based on the block line intermediate language of the start block line of the block to undergo image formation.

The closed region rendering unit 202 determines a value designated as the block mode specified in the block intermediate language (step S1804). If the block mode has a value other than "1", "2", and "3", the process advances to step S1805.

The closed region rendering unit 202 performs processing of rendering a block line specified in the block intermediate language (step S1805). This processing will be described in more detail later with reference to FIG. 21. In this processing, rendering processing is performed based on the non-optimized, conventional block intermediate language. The closed region rendering unit 202 determines whether repetitions of rendering processing in a number corresponding to the block height are complete (step S1806). If the repetitions are incomplete (NO in step S1806), the block division unit 201 repeats rendering processing a number of times corresponding to the block height.

If it is determined in step S1804 that "1" is designated as the block mode, the process advances to step S1807. The closed region rendering unit 202 performs processing of acquiring single-color information specified in the block intermediate language (step S1807). When an image of, for example, the block 1 1401 is to be formed, the closed region rendering unit 202 acquires single-color information (block line intermediate language 1612) (step S1807). Since the single-color information (block line intermediate language 1612) acquired in step S1807 indicates the rendering result, the closed region rendering unit 202 outputs this single-color information as the rendering result intact (step S1808). The closed region rendering unit 202 determines whether repetitions of rendering processing in a number corresponding to the block height are complete (step S1809). If the repetitions are incomplete (NO in step S1809), the closed region rendering unit 202 repeats rendering processing a number of times corresponding to the block height.

If it is determined in step S1804 that "2" is designated as the block mode, the process advances to step S1810. The closed region rendering unit 202 performs cache block line rendering processing, that is, optimized rendering processing using the block line intermediate language of the start block line of the block intermediate language (step S1810). This processing will be described in more detail later with reference to FIG. 20. The closed region rendering unit 202 determines whether repetitions of rendering processing in a number corresponding to the block height are complete (step S1811). If the repetitions are incomplete (NO in step S1811), the closed region rendering unit 202 repeats rendering processing a number of times corresponding to the block height.

If it is determined in step S1804 that "3" is designated as the block mode, the process advances to step S1812. The closed region rendering unit 202 performs cache block line rendering processing, that is, optimized rendering processing using the block line intermediate language of the start block line of the block intermediate language (step S1812). This processing is the same as in step S1810 and will be described in more detail later with reference to FIG. 20. If "3" is designated as the block mode, cache block line rendering processing (FIG. 20) can be performed only for the first block line to the predetermined block line. Therefore, the closed region rendering unit 202 repeats cache block line rendering processing a number of times corresponding to a predetermined number of block lines (NO in step S1813).

The closed region rendering unit 202 performs block line rendering processing (step S1814). This processing is the same as in step S1805 and will be described in more detail later with reference to FIG. 21. The closed region rendering unit 202 determines whether repetitions of rendering processing in a number corresponding to the block height are complete (step S1815). If the repetitions are incomplete (NO in step S1815), the closed region rendering unit 202 repeats block line rendering processing (step S1814) until repetitions of rendering in a number corresponding to the block height are complete.

Block Line Initialization Processing

FIG. 19 is a flowchart showing the detailed sequence of the block line initialization processing (step S1803) shown in FIG. 18 of this embodiment.

First, the closed region rendering unit 202 performs processing of acquiring the block line intermediate language of the start block line of the block to undergo image formation (step S1901). The closed region rendering unit 202 acquires closed region information from the block line intermediate language of the start block line, and stores necessary information on the cache block line (step S1902). The closed region rendering unit 202 performs processing of initializing layers included in the closed regions, and processing of storing them on the cache block line (step S1903). The closed region rendering unit 202 repeats the processing operations in steps S1902 and S1903 a number of times corresponding to the number of closed regions included in the block line (step S1904), and then ends the block line initialization processing.

Cache Block Line Rendering Processing

FIG. 20 is a flowchart showing the detailed sequence of the cache block line rendering processing (steps S1810 & S1812) shown in FIG. 18 of this embodiment.

First, the closed region rendering unit 202 acquires necessary closed region information from the cache block line (step S2001). In this case, only acquisition processing is performed because the closed region information has already been converted into a renderable format in the block line initialization processing (step S1803). The closed region rendering unit 202 acquires the closed region information acquired in step S2001, and performs rendering processing based on the acquired information (step S2002). The closed region rendering unit 202 repeats the processing operations in steps S2001 and S2002 a number of times corresponding to the number of closed regions included in the block line (step S2003), and then ends the cache block line rendering processing.

Block Line Rendering Processing

Figure 21:
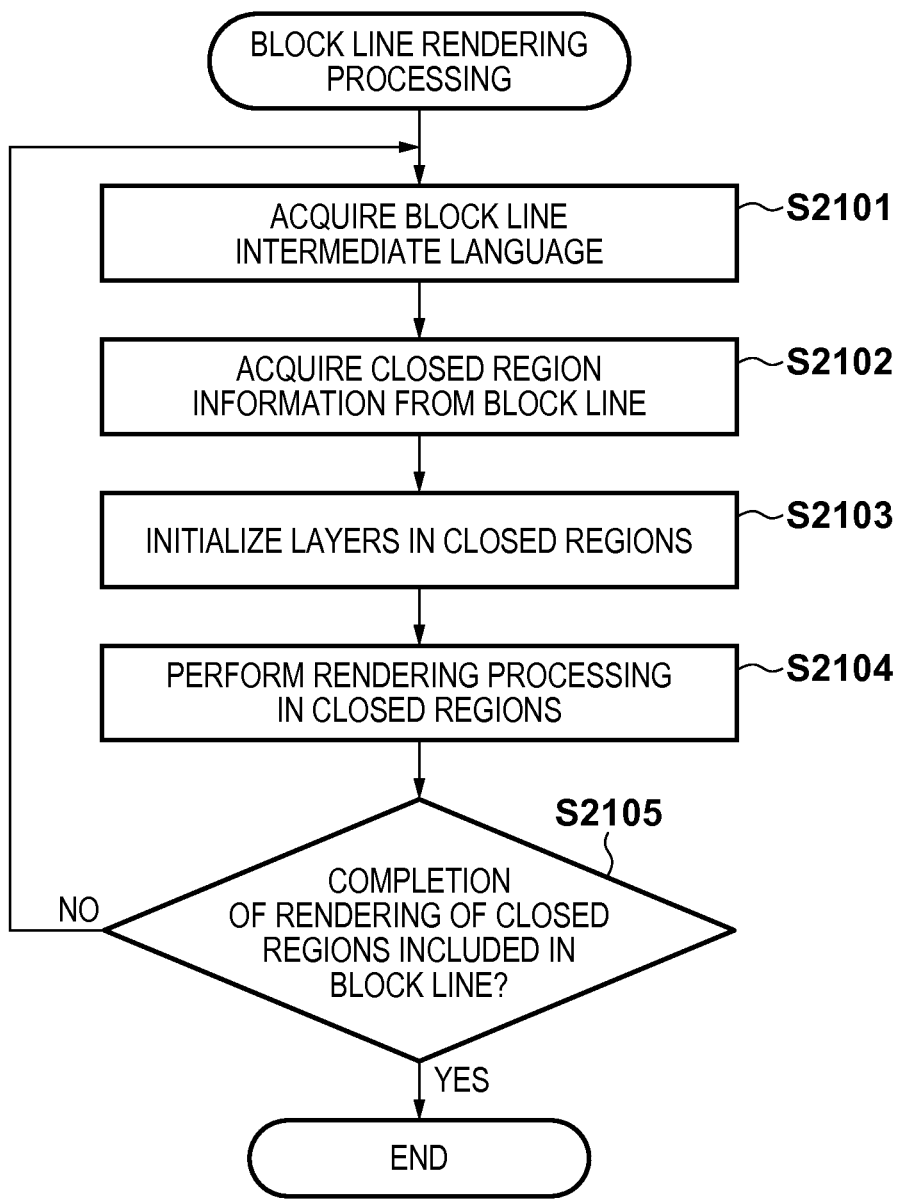
FIG. 21 is a flowchart showing the detailed sequence of block line rendering processing.

FIG. 21 is a flowchart showing the detailed sequence of the block line rendering processing (steps S1805 & S1814) shown in FIG. 18 of this embodiment.

First, the closed region rendering unit 202 performs processing of acquiring the block line intermediate language of the block to undergo image formation from the block intermediate language (step S2101). The closed region rendering unit 202 acquires closed region information from the block line intermediate language acquired in step S2101 (step S2102). The closed region rendering unit 202 performs processing of initializing layer information included in the closed regions (step S2103). Note that this processing can be omitted when the layer information is stored on the cache block line, but is performed for each block line in this case.

The closed region rendering unit 202 performs rendering processing based on the closed region information acquired in step S2102 (step S2104). The closed region rendering unit 202 repeats the processing operations in steps S2101 to S2104 a number of times corresponding to the number of closed regions included in the block line (step S2105), and then ends the cache block line rendering processing.

Note that in this embodiment, an example in which the components of the block line included in the block changes once have been taken as an example, as exemplified by block 4 shown in FIGS. 16A, 16B, and 16C. However, depending on the size of the block, the components of the block line may change a plurality of times in the block. To cope with this, the number of pieces of information included in, for example, the block line intermediate language 1641 can be increased.

The above-mentioned processing allows image forming processing using an appropriate block line intermediate language for each block even if image data is divided into blocks, and a speed-up of the processing.

Also, the above-mentioned processing and data structure makes it possible to reduce the amount of data held in forming an image.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-136710, filed Jun. 20, 2011, which is hereby incorporated by reference herein in its entirety.

What is claimed is:

1. An image forming apparatus comprising:
an input unit configured to input image data of a page including one or more objects;
an obtaining unit configured to obtain a block image data of a block part of the page, a width of the block part being less than a width of the page, the block image data including a first scan line and a second scan line, wherein each of the first and the second scan lines are formed by one or more closed regions, and each closed region is associated with information indicating at least one of the one or more objects contributing to the closed region;
a determining unit configured to determine whether a first set of one or more closed regions forming the first scan line and a second set of one or more closed regions forming the second scan line are identical, with respect to a number of closed regions and the information of each closed region; and
a rasterizing unit configured to rasterize the first scan line using first intermediate data which is generated by analyzing the second scan line and is used for rasterization of the second scan line if the first set and the second set are identical, and to rasterize the first scan line using second intermediate data which is generated by analyzing the first scan line without using the first intermediate data if the first set and the second set are not identical.

2. The image forming apparatus according to claim 1, wherein the determining unit further comprises:
a number determining unit configured to determine whether a number of the one or more closed regions forming the first scan line is identical to a number of the one or more closed regions forming the second scan line;
a component determining unit configured to determine whether components of each of the one or more closed regions forming the first scan line are identical to components of each of the one or more closed regions forming the second scan line.

3. The image forming apparatus according to claim 2, wherein, if the number determining unit determines both the number of the one or more closed regions forming the first scan line to be one and the number of the one or more closed regions forming the second scan line to be one and if the component determining unit determines all the components of the one closed region forming the first scan line and all the components of the one closed region forming the second scan line to be both identical and a set of single-colors, the rasterizing unit rasterizes the first scan line using single color information that has been used for the second scan line.

4. The image forming apparatus according to claim 1, wherein the rasterizing unit skips generating the second intermediate data if the first set of one or more closed regions forming the first scan line of the block image data and the second set of one or more closed regions forming the second scan line of the block image data are identical.

5. The image forming apparatus according to claim 1, wherein the first information is a closed region intermediate data indicating objects associated with each of closed regions forming the second scan line.

6. The image forming apparatus according to claim 1, wherein the second information is a closed region intermediate data indicating objects associated with each of closed regions forming the first scan line.

7. An image forming method comprising the steps of:
inputting image data of a page including one or more objects;
obtaining a block image data of a block part of the page, a width of the block part being less than a width of the page, the block image data including a first scan line and a second scan line, wherein each of the first and the second scan lines are formed by one or more closed regions, and each closed region is associated with information indicating at least one of the one or more objects contributing to the closed region;
determining whether a first set of one or more closed regions forming the first scan line and a second set of one or more closed regions forming the second scan line are identical, with respect to a number of closed regions and the information of each closed region; and
rasterizing the first scan line using first intermediate data which is generated by analyzing the second scan line and is used for rasterization of the second scan line if the first set and the second set are identical, and rasterizing the first scan line using second intermediate data which is generated by analyzing the first scan line without using the first intermediate data if the first set and the second set are not identical.

8. A non-transitory computer-readable medium storing a program for causing a computer to function as:

an input unit configured to input image data of a page including one or more objects;

an obtaining unit configured to obtain a block image data of a block part of the page, a width of the block part being less than a width of the page, the block image data including a first scan line and a second scan line, wherein each of the first and the second scan lines are formed by one or more closed regions, and each closed region is associated with information indicating at least one of the one or more objects contributing to the closed region;

a determining unit configured to determine whether a first set of one or more closed regions forming the first scan line and a second set of one or more closed regions forming the second scan line are identical, with respect to a number of closed regions and the information of each closed region; and a rasterizing unit configured to rasterize the first scan line using first intermediate data which is generated by analyzing the second scan line and is used for rasterization of the second scan line if the first set and the second set are identical, and to rasterize the first scan line using second intermediate data which is generated by analyzing the first scan line without using the first intermediate data if the first set and the second set are not identical.

* * * * *